(12) United States Patent
Schleifer et al.

(10) Patent No.: US 8,386,558 B2
(45) Date of Patent: *Feb. 26, 2013

(54) CROSS-POLLINATION SYNCHRONIZATION OF DATA

(75) Inventors: Jason E. Schleifer, Seattle, WA (US);
Gary W. Hall, Redmond, WA (US);
Garry K. Tan, Seattle, WA (US); James P. Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

This patent is subject to a terminal disclaimer.

(21) Appl. No.: 11/113,688

(22) Filed: Apr. 25, 2005

(65) Prior Publication Data

US 2006/0020804 A1 Jan. 26, 2006

Related U.S. Application Data

(63) Continuation-in-part of application No. 10/771,896, filed on Feb. 4, 2004, now Pat. No. 7,526,768.

(51) Int. Cl.
*G06F 15/16* (2006.01)
*G06F 17/00* (2006.01)
(52) U.S. Cl. .............................. 709/203; 706/47; 707/610
(58) Field of Classification Search .................. 455/517, 455/556.2; 707/201, 203, 610–613; 715/203, 715/229; 719/311; 709/201–207, 217–219; 706/47
See application file for complete search history.

(56) References Cited

U.S. PATENT DOCUMENTS

| | | | |
|---|---|---|---|
| 4,714,992 A | 12/1987 | Gladney et al. | |
| 5,822,758 A | 10/1998 | Loper et al. | |
| 5,867,494 A | 2/1999 | Krishnaswamy et al. | |
| 5,867,495 A | 2/1999 | Elliott et al. | |
| 5,974,238 A | 10/1999 | Chase, Jr. | |
| 5,999,525 A | 12/1999 | Krishnaswamy et al. | |
| 6,041,365 A | 3/2000 | Kleinerman | |
| 6,223,187 B1 * | 4/2001 | Boothby et al. | 1/1 |
| 6,260,077 B1 | 7/2001 | Rangarajan et al. | |
| 6,275,957 B1 | 8/2001 | Novik et al. | |
| 6,314,533 B1 | 11/2001 | Novik et al. | |
| 6,317,754 B1 | 11/2001 | Peng | |
| 6,335,927 B1 | 1/2002 | Elliott et al. | |
| 6,343,299 B1 | 1/2002 | Huang et al. | |
| 6,367,034 B1 | 4/2002 | Novik et al. | |
| 6,463,427 B1 * | 10/2002 | Wu | 707/3 |
| 6,470,329 B1 * | 10/2002 | Livschitz | 707/1 |
| 6,487,208 B1 | 11/2002 | Chirashnya et al. | |
| 6,487,560 B1 * | 11/2002 | LaRue et al. | 707/203 |
| 6,502,102 B1 | 12/2002 | Haswell et al. | |
| 6,523,027 B1 | 2/2003 | Underwood | |
| 6,560,720 B1 | 5/2003 | Chirashnya et al. | |
| 6,598,059 B1 | 7/2003 | Vasudevan et al. | |

(Continued)

OTHER PUBLICATIONS

Miller, R. et al., "Synchronizing Clipboards of Multiple Computers," *Chi Letters*, vol. 1, No. 1, 65-66 (1999).

(Continued)

*Primary Examiner* — Charles E Anya
(74) *Attorney, Agent, or Firm* — Merchant & Gould P.C.

(57) ABSTRACT

A technique and mechanism to effect cross-pollination synchronization of PIM (personal information manager) data to multiple sources. Additionally, a novel feature of the subject invention is the ability to effect cross-pollination synchronization with any number of devices and sources in a network. The invention provides for a user to employ a mobile device or set of devices as a central repository for PIM data (e.g., calendar, contacts and tasks) synchronized from multiple sources (e.g., multiple PC's (personal computers), an exchange server). The invention provides for synchronization of PIM data from multiple types of server sources to multiple devices regardless of the synchronization protocol versions and different schemas.

23 Claims, 22 Drawing Sheets

U.S. PATENT DOCUMENTS

| | | | |
|---|---|---|---|
| 6,601,195 B1 | 7/2003 | Chirashnya et al. | |
| 6,601,233 B1 | 7/2003 | Underwood | |
| 6,609,128 B1 | 8/2003 | Underwood | |
| 6,633,878 B1 | 10/2003 | Underwood | |
| 6,633,924 B1* | 10/2003 | Wu et al. | 719/328 |
| 6,647,432 B1 | 11/2003 | Ahmed et al. | |
| 6,650,739 B1* | 11/2003 | Doeberl et al. | 379/88.18 |
| 6,678,741 B1 | 1/2004 | Northcutt et al. | |
| 6,701,514 B1 | 3/2004 | Haswell et al. | |
| 6,704,873 B1 | 3/2004 | Underwood | |
| 6,718,535 B1 | 4/2004 | Underwood | |
| 6,725,281 B1 | 4/2004 | Zintel et al. | |
| 6,731,625 B1 | 5/2004 | Eastep et al. | |
| 6,754,181 B1 | 6/2004 | Elliott et al. | |
| 6,799,190 B1* | 9/2004 | Boothby | 707/204 |
| 6,870,546 B1 | 3/2005 | Arsenault et al. | |
| 6,907,546 B1 | 6/2005 | Haswell et al. | |
| 6,909,708 B1 | 6/2005 | Krishnaswamy et al. | |
| 6,983,293 B2* | 1/2006 | Wang | 1/1 |
| 7,100,195 B1 | 8/2006 | Underwood | |
| 7,145,898 B1 | 12/2006 | Elliott | |
| 7,219,329 B2 | 5/2007 | Meijer et al. | |
| 7,376,697 B2* | 5/2008 | Koskimies | 709/203 |
| 7,526,768 B2 | 4/2009 | Schleifer et al. | |
| 2002/0010807 A1 | 1/2002 | Multer et al. | |
| 2002/0064149 A1 | 5/2002 | Elliott et al. | |
| 2002/0078307 A1 | 6/2002 | Zahir | |
| 2002/0095663 A1* | 7/2002 | Joory | 717/136 |
| 2002/0108091 A1* | 8/2002 | Flanagin et al. | 714/798 |
| 2002/0156931 A1 | 10/2002 | Riedel | |
| 2002/0198848 A1 | 12/2002 | Michener | |
| 2003/0005161 A1* | 1/2003 | Chen et al. | 709/248 |
| 2003/0115378 A1 | 6/2003 | Zondervan et al. | |
| 2003/0159136 A1 | 8/2003 | Huang et al. | |
| 2005/0033561 A1 | 2/2005 | Orofino | |
| 2005/0050545 A1 | 3/2005 | Moakley | |
| 2005/0060370 A1* | 3/2005 | Xue et al. | 709/204 |
| 2005/0073991 A1 | 4/2005 | Roberts et al. | |
| 2005/0102328 A1* | 5/2005 | Ring et al. | 707/201 |
| 2005/0114431 A1 | 5/2005 | Singh et al. | |
| 2005/0165884 A1 | 7/2005 | Masek | |
| 2006/0031927 A1 | 2/2006 | Mizuno et al. | |
| 2006/0224775 A1 | 10/2006 | Lee et al. | |
| 2007/0067373 A1 | 3/2007 | Higgins et al. | |
| 2007/0180075 A1 | 8/2007 | Chasman et al. | |

OTHER PUBLICATIONS

Ramsey, N. et al., "An Algebraic Approach to File Synchronization," *ESEC/FSE*, Vienna, Austria, pp. 175-185 (2001).

Swierk, E. et al., "The Roma Personal Metadata Service," *Mobile Networks and Applications*, vol. 7, pp. 407-418 (2002).

* cited by examiner

CROSS-POLLINATION SYNCHRONIZATION OF DATA

CROSS-REFERENCE TO RELATED APPLICATIONS

This application is continuation-in-part of U.S. patent application Ser. No. 10/771,896 entitled "Cross-Pollination of Multiple Sync Sources" and filed on Feb. 4, 2004 (now U.S. Pat. No. 7,526,768). The entirety of the above-noted application is incorporated by reference herein.

TECHNICAL FIELD

This invention is related to computer systems and more particularly to cross-pollination synchronization of PIM (personal information manager) data between multiple sources and multiple devices.

BACKGROUND OF THE INVENTION

Electronic organizers are widely used to manage and organize a variety of PIM (personal information manager) data. An electronic organizer (e.g., PIM) enables a user to electronically retain personal data for any purpose and to retrieve the data as desired. Today, PIMs can vary widely, but common to all of them is to provide methods for managing and organizing personal information and to make the information readily available to the user.

By way of example, in accordance with a common PIM, a user can search contact entries alphabetically by name, by keyword, etc. Appointments can be searched by date, topic, etc. Essentially, once personal data is entered into a PIM, the user can query the data to retrieve the information in any manner desired.

PIMs have become increasingly more common. For instance, personal data assistants (PDAs) are probably the most common example of a PIM. Additionally, emerging mobile devices such as mobile telephones, smart phones, and handheld computers incorporate PIM functionality. Oftentimes, a user has multiple devices for which synchronization and/or cross-pollination of data is desired. By way of example, it is not uncommon for a user to have a PDA, a mobile telephone, a home personal computer (PC) and a work PC whereby cross-pollination of data is desired.

A common problem in a multi-device scenario is the generation of sync loops. By way of example, suppose a user synchronizes a contact from a first data source to a first device. Next, the contact is synchronized to a second data source. The contact is then synchronized from the second data source to a second device and ultimately back to the first data source. Once received at the first data source, the contact will appear as a modified version of the contact thus prompting a continual sync loop.

As described supra, a PIM or personal organizer can be synchronized with a source whereby the information is cross-pollinated onto a disparate source from the PIM. However, prior implementations are prone to creating duplicative entries as a result of synchronization. As well, as described above, prior implementations can generate "sync loops" whereby devices view information as changed information thereby initiating continuous looping of data.

Users who want their mobile device(s) to be a central repository for PIM data (e.g., calendar, contacts and tasks items) often synchronize from multiple sources. Today, users that employ multiple personal computers and an exchange server do not have an automated tool capable of adequately performing this synchronization task. Prior synchronization algorithms that attempted to synchronize a device or group of devices with multiple sources encountered duplicate entries, lost user data, and perpetual sync loops causing data to be synchronized multiple times.

What is needed is a system and/or methodology that provides for synchronization of PIM data from multiple sources (e.g., desktop Outlook-brand and exchange front-end servers) regardless of the synchronization protocol versions and different schemas. Further, a need exists for a system that allows for changes to be tracked and passed on to all sources, whereby duplicative items can be detected and prevented.

Moreover, a need exists for a system that includes a central repository for PIM data (e.g., calendar, contacts and tasks items) synchronized from multiple sources (e.g., two PC's, and an exchange server). As well, a need exists for a system where synchronization allows for changes to be tracked and passed on to all sources and devices while detecting and preventing duplicative data items and sync loops.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a technique and mechanism to effect cross-pollination synchronization of PIM (personal information manager) data to multiple sources. Additionally, a novel feature of the subject invention is the ability to effect cross-pollination synchronization with any number of devices and sources in a network.

The invention provides for a user to employ a mobile device or set of devices as a central repository for PIM data (e.g., calendar, contacts and tasks) synchronized from multiple sources (e.g., multiple PCs (personal computers), an exchange server). Prior synchronization algorithms that attempted to synchronize a single device with multiple sources encountered duplicate entries, lost user data, and perpetual sync loops where data is synchronized multiple times. The subject invention provides for synchronization of PIM data from multiple types of server sources to multiple devices regardless of the synchronization protocol versions and different schemas.

In another aspect, the invention provides for data changes to be tracked and passed on to all sources as well as duplicate items to be detected and prevented. In other words, items that have previously been synchronized can be detected whereby duplicative entries can be eliminated.

In addition to tracking data items added to a device/source, the subject invention provides mechanisms for processing changes to data items. Accordingly, edits can be saved to a device and propagated to other sources when synchronized. This can be possible as the invention provides mechanisms to track all changes. In still another aspect, a mechanism for processing deletes can be provided. Conventionally, the protocol sends down a delete for an item if it falls out of filter or if it is physically deleted. Because of possible data loss with the propagation of out-of-filter deletes across cross-pollinating sources, an aspect of the invention discloses a "hard" delete command (e.g., propagates across all cross-pollinating sources) that can be added to the synchronization protocol (e.g., AirSync-brand protocol) which will allow for differentiation between a "soft" and "hard" delete.

Another aspect is directed to a mechanism to detect duplicate items upon cross-pollination synchronization. The device can implement a form of property-level comparison which can be used to identify duplicates. Aspects can employ unique values (e.g., hash values) to effect comparison and detection of duplicates.

Still another aspect is directed to a mechanism for handling conflicts for items edited at both data sources. Synchronizing with multiple server versions is the subject of yet another aspect of the invention.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
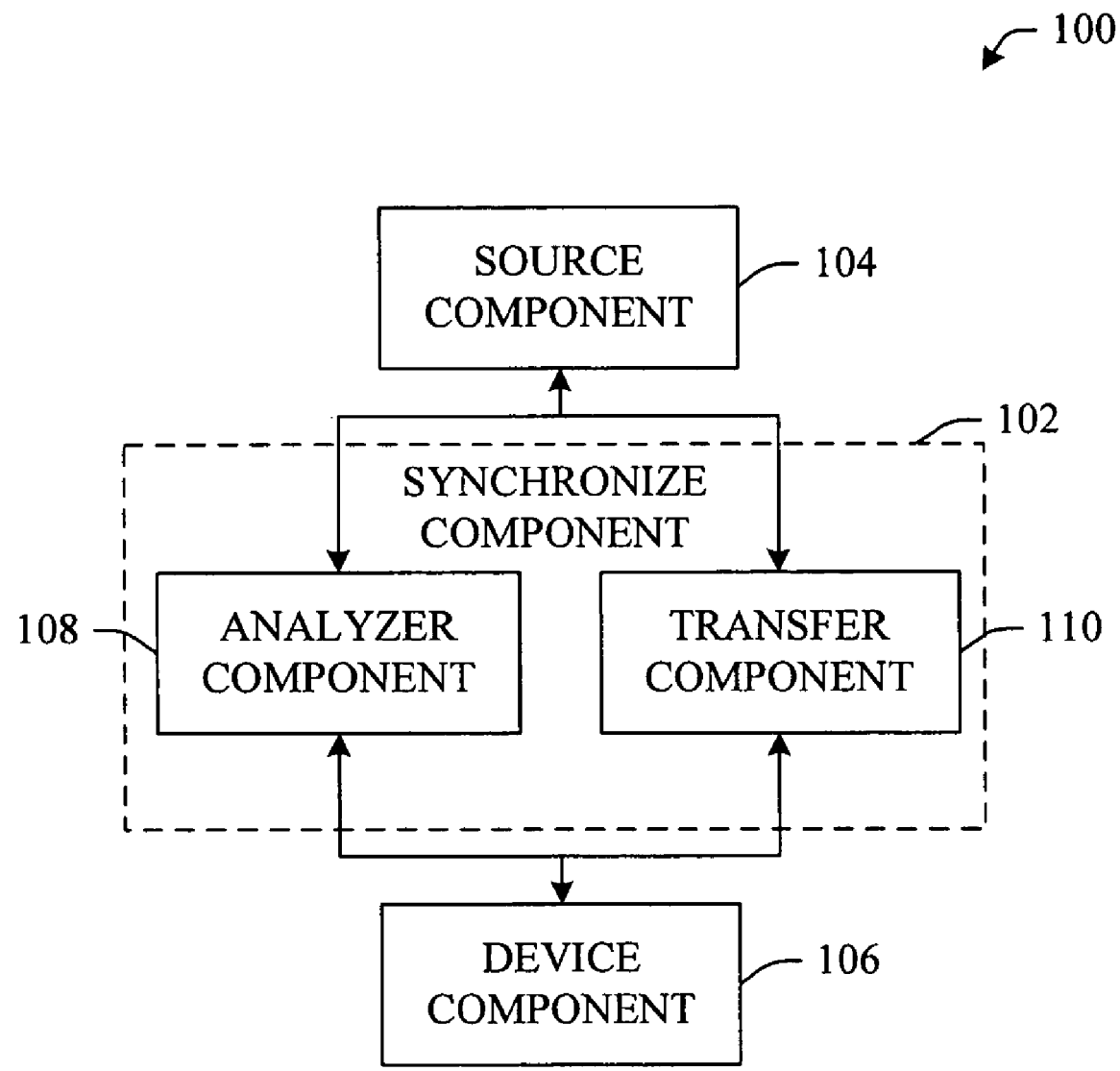
FIG. 1 illustrates a system that facilitates cross-pollination synchronization of data in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates cross-pollination synchronization of data in accordance with an aspect of the invention. Generally, system 100 can include a synchronize component 102 that facilitates synchronizing data between a source component 104 and a device component 106. In accordance with the present invention, the synchronize component 104 can facilitate cross-pollination between one or more disparate sources and one or more disparate devices. These alternative aspects will be better understood upon a discussion of the figures that follow.

As illustrated in FIG. 1, the synchronize component 102 can include an analyzer component 108 and a transfer component 110. The analyzer component 108 can analyze a data item in accordance with the novel cross-pollinating synchronization of the invention. In accordance with an output from the analyzer component 108, the transfer component 110 can facilitate populating the data item onto either the source or device as appropriate.

In one aspect, the analyzer component 108 can examine a data item received from the data source component 104. By way of example, the analyzer component 108 can evaluate the data item received in relation to contents (e.g., data items) of device component 106. If upon evaluating the received data item it is determined that the data item is distinct from contents of the device component 106, the transfer component 110 can transfer the data item to the source component 104. In one aspect, the transferred item overwrites an existing data item in the source component 104. In another aspect, the transferred item is added to the contents of the source component 104.

Although the aspect illustrated in FIG. 1 is directed to synchronizing a data item between a source component 104 and a device component 106, it is to be understood that other aspects and system architectures exists that employ multiple source and/or multiple device components. These alternative aspects can employ the novel functionality (e.g., cross-pollination) of the synchronize component 102 described herein.

In another aspect, the invention provides for changes to be tracked and passed on to all sources as well as duplicate items to be detected and prevented. In other words, items that have previously been synchronized can be detected whereby duplicative entries can be eliminated.

In addition to tracking data items added to a device/source, the subject invention can include mechanisms for processing changes to data items. Accordingly, edits can be saved to a device and propagated to other sources when synchronized. This can be possible as the invention provides mechanisms to track all changes. In still another aspect, a mechanism for processing deletes can be provided. Conventionally, the protocol sends down a delete for an item if it falls out of filter or if it is physically deleted.

Because of possible data loss with the propagation of out-of-filter deletes across cross-pollinating sources, an aspect of the invention discloses a "hard" delete command that can be added to the synchronization protocol (e.g., AirSync-brand protocol) which will allow for differentiation between a "soft" and "hard" delete. With respect to a "hard" delete, the item can be physically deleted from the store. This "hard" delete can propagate across all cross-pollinating sources in accordance with the invention. On the other hand, a "soft" delete refers to the situation when an item has gone out of filter. Accordingly the invention can remove the item from the device, but does not propagate the delete to any other source.

Another aspect is directed to a mechanism to detect duplicate items upon cross-pollination synchronization. The device can implement a form of property-level comparison which can be used to identify duplicates. Each item on the device can have a hash value that is stored as a custom property on the item. When a device receives an add it can first calculate the hash value for the new item. The device can then search the store for an item with the identical hash value. If the hash value is located, the device will consider the item a duplicate. Accordingly, the invention can associate the item that the server sent down with an item already present on the device.

Still another aspect is directed to a mechanism for handling conflicts for items edited at both data sources. Synchronizing with multiple server versions is the subject of yet another aspect of the invention. For example, suppose a device is synchronizing with a server of version 2.0, and desktop synchronizing with a desktop version 2.5. In this scenario, suppose version 2.0 supports properties ABC, and version 2.5 supports an additional property D. The invention can provide for the device to have the richest set of properties from all sources for which it cross-pollinates. This can be accomplished by writing detected duplicates to the device, since it is not possible to determine whether that duplicate was from a source that supported a higher or lower version of the protocol.

If the source supports a lower version than the other source, the invention writes to the device and does not get any additional info. The information will be written to the other source once on the next synchronization cycle. Effectively, when the aspect writes a change, it only writes changes on properties for which the protocol is aware. In the example, since the item is of a lower version (e.g., 2.0), the system does not know about property D. Therefore, it does not touch it, regardless of whether it exists or not. On the other hand, if the source supports a higher version than the other source, the invention writes to the device and gets the additional properties (e.g., in the example, property D) that was not present previously.

Figure 2:
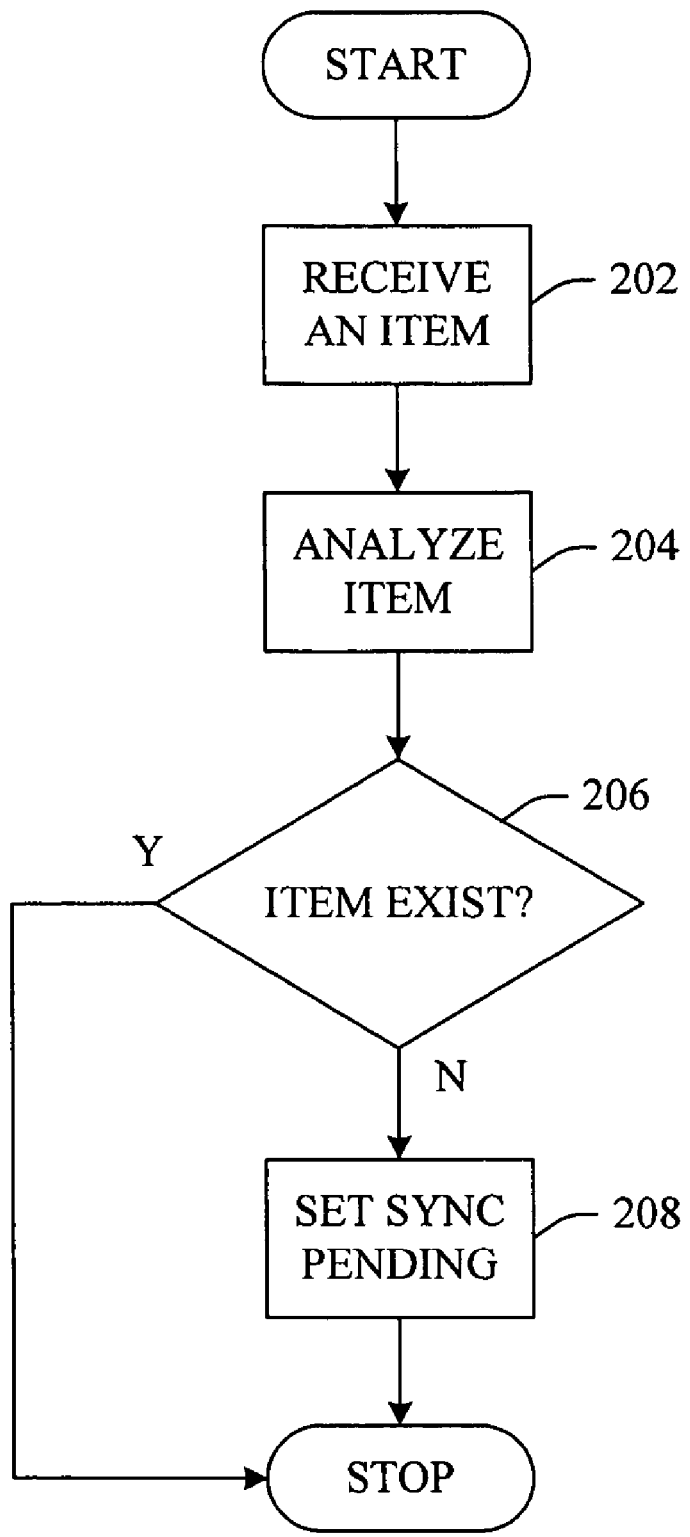
FIG. 2 illustrates an exemplary flow chart of procedures to cross-pollinate a data item in accordance with a disclosed aspect.

FIG. 2 illustrates a methodology of cross-pollinating an item in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, a data item is received. This data item can be received at a data source and/or device (e.g., handheld device, PDA). At 204, the data item is analyzed to determine if it present on the received device. For example, the data item can be analyzed in accordance with a hash value, time stamp, version, etc. As will be described in greater detail below, rules-based logic can be employed to manage the operation of the analyzer and/or system.

A determination is made at 206 if the data item exists. It is to be appreciated that this determination is based upon the criteria and/or characteristic(s) employed at 204. If the item exists, a stop block is reached as illustrated. If the item does not exist, synchronize pending is set at 208. It will be appreciated that this data item can be synchronized between devices.

Figure 3:
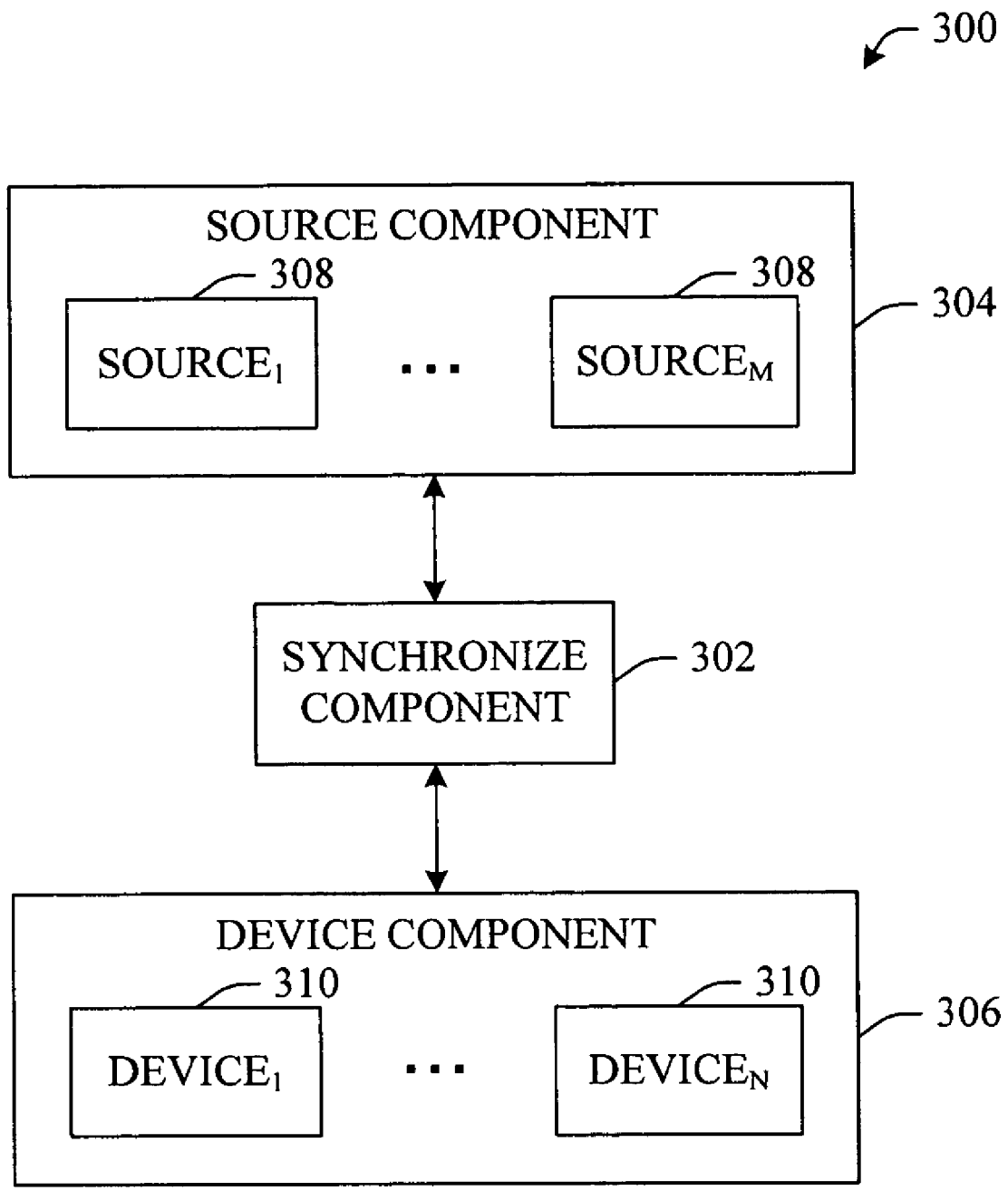
FIG. 3 illustrates a block diagram of a cross-pollination system having multiple source components and multiple device components in accordance with an aspect of the invention.

Referring now to FIG. 3, there is illustrated an alternative architectural diagram of a system 300 in accordance with an aspect of the invention. Generally, system 300 can include a synchronize component 302, a source component 304 and a device component 306, all of which can have the same or similar functionality as described with reference to FIG. 1 supra. More particularly, FIG. 3 illustrates that source component 304 can include 1 to M source components, where M is an integer. Source components 1 to M can be referred to individually or collectively as source components 308. Similarly, as illustrated in FIG. 3, device component 306 can include 1 to N device components, where N is an integer. It is to be understood that 1 to N device components can be referred to individually or collectively as device components 310.

Figure 4:
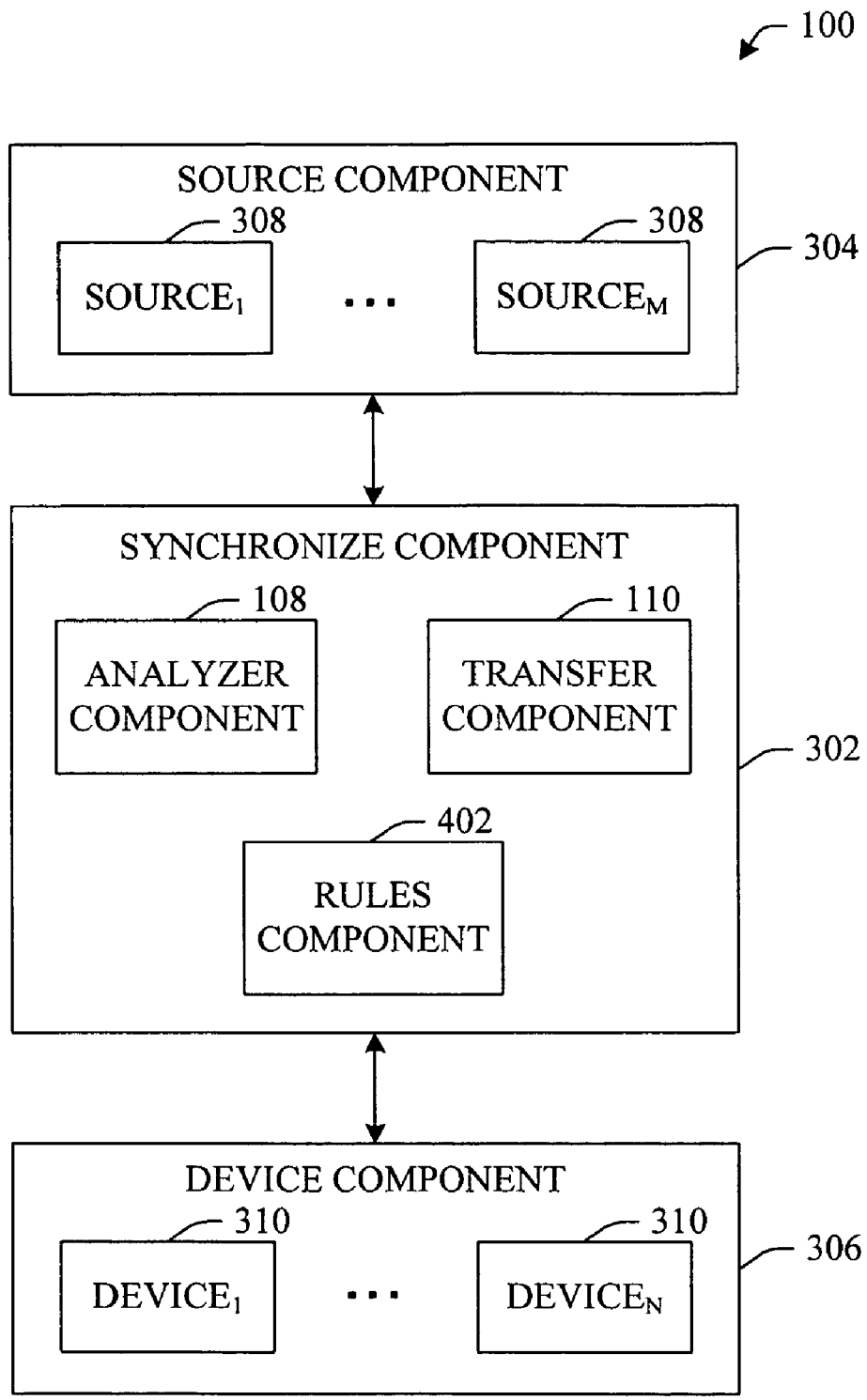
FIG. 4 illustrates a block diagram of a cross-pollination system that employs an analyzer component together with a rules component to effect cross-pollination and to resolve conflicts in accordance with an aspect.

With reference now to FIG. 4, an alternative block representation of system 300 is shown. As illustrated, the synchronize component 302 can include an analyzer component 108 and a transfer component 110 as described with reference to FIG. 1. Additionally, the synchronize component can include a rules component 402 that facilitates managing the operation of the synchronize component 302. By way of example, the rules component 402 can instruct the system when and/or if to override an item upon the detection of a conflict. As well, the rules component 402 can define a device/source hierarchy whereby, a particular component or set of component(s) can be predefined to override another component or set of component(s).

Additionally, the rules component 402 can be employed to factor device characteristics (e.g., memory capacity, battery longevity) into decision making logic with respect to cross-pollinating and/or synchronizing. It is to be appreciated that any decision logic can be predefined by the rules component 402. Artificial intelligence (AI) based logic can be employed to predict and/or infer an action to be automatically performed with respect to cross-pollination and/or synchronization in accordance with the invention. These alternative AI-based schemes will be described in greater detail infra with reference to FIG. 6.

Figure 5:
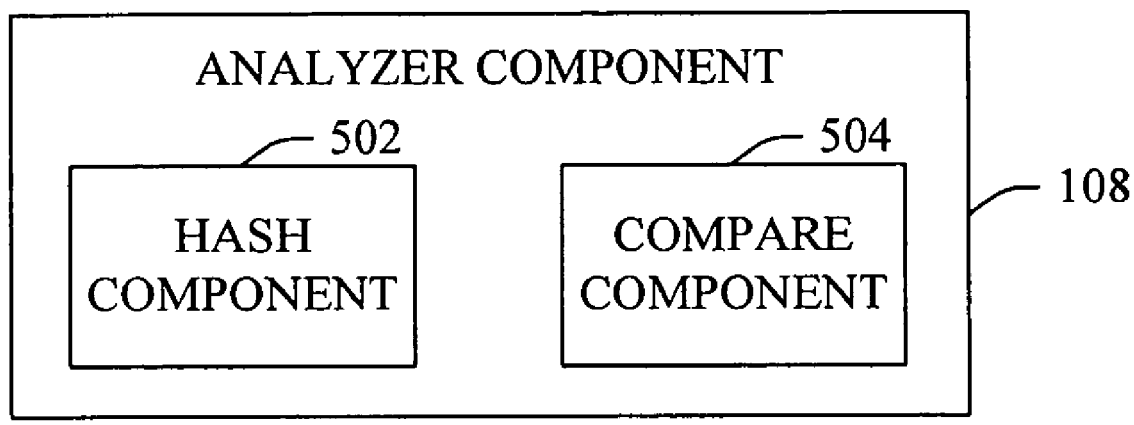
FIG. 5 is a block diagram of an analyzer component having a hash component and a compare component in accordance with an aspect of the invention.

FIG. 5 illustrates a component block diagram of an analyzer component 106. As illustrated, analyzer component 106 can include a hash component 502 and a compare component 504. The analyzer component 106 can employ the hash component 502 to compute a hash of the received data item. Subsequently, the computed hash can be compared to the content of a target device and/or source. It is to be appreciated that any desired hash function (e.g., algorithm) can be utilized without departing from the spirit and/or scope of the invention.

The compare component 504 can be employed to effect comparing the hash value to hash values contained within a device and/or source. As described supra, the system can utilize rules and/or AI based logic to act upon the result(s) of such a comparison. Although the example of FIG. 5 employs the use of a hash value to compare a received data item to a data item(s) in a disparate device (or set of devices), it will be appreciated that any method of uniquely comparing the items can be used in connection with alternative aspects of the invention.

In operation, when an item is added to a device, a hash can be calculated by the hash component 502. This hash can correspond to any subset of the items properties. When a device receives a data item to add, the device employs the hash component 502 to generate a hash. Subsequently, the compare component 504 can be employed to compare the calculated hash of the new item to a has of the existing items. It is to be understood that this facilitates the detection of duplicate data items.

In accordance with an aspect, two levels of property level matching can be employed in calculating the hash value. The two levels of property level matching in accordance with this aspect are exact data comparison and property existence. Each of these will be described in greater detail below.

With regard to exact data comparison (e.g., primary keyset), a field or set of fields can be defined as the primary properties to be compared to consider the item a duplicate. This field or set of fields can be distinct for each data type (e.g., contacts, tasks). An exemplary secondary keyset can be property existence. In one aspect, this can refer to a larger set of fields than the primary keyset. The set of fields can be employed to verify the existence of data related to the properties. It will be appreciated that this set of fields can assist to determine that if a field is set in one item and is blank in another, the items will not be considered duplicates. This determination can be made even if the primary key matches.

Upon generating and/or synchronizing an item, the hash component 502 can calculate a hash and store the hash on the particular data item. The hash value can be updated upon any modification of the item. Following is an exemplary primary and secondary keyset for Contacts, Calendar, and Tasks, according to one aspect. It is to be appreciated that the list that follows is an exemplary list and other detection properties can be employed without departing from the novel functionality of the invention.

| Contacts Hash Algorithm | Properties |
| --- | --- |
| Primary Keyset (Exact data comparison) | FirstName LastName Last 4 chars of HomePhoneNumber Last 4 chars of BusinessPhoneNumber |
| Secondary Keyset (Property Existance) | Anniversary, AssistantName, AssistnamePhoneNumber, Birthday, Body, Business2PhoneNumber, BusinessCity, BusinessCountry, BusinessPostalCode, BusinessState BusinessStreet, BusinessFaxNumber, CarPhoneNumber, CompanyName, Department, Email1Address, Email2Address, Email3Address, FileAs, Home2PhoneNumber, HomeCity, HomeCountry, HomePostalCode, HomeState, HomeStreetm HomeFaxNumber, JobTitle, MiddleName, MobilePhoneNumber, OfficeLocation, OtherCity, OtherCountry, OtherPostalCode OtherState, OtherStreet, PagerNumber, RadioPhoneNumber, Spouse, Suffix, Title, WebPage |
| Calendar Hash Algorithm | Properties |
| Primary Keyset (Exact data comparison) | UID, StartTime, Location, Subject |
| Secondary Keyset (Property Existance) | AllDayEvent, Email, Name, DtStamp, EndTime, Deleted, ExceptionStartTime, MeetingStatus, OrganizerEmail, OrganizerName, Recurrence, Type, |

-continued

| | Until, Occurrences, Interval, DayOfWeek, DayOfMonth, WeekOfMonth, MonthOfYear, Reminder |
|---|---|
| Tasks SyncHash Algorithm | Properties |
| Primary Keyset (Exact data comparison) | Subject, DueDate, Categories |
| Secondary Keyset (Property Existance) | StartDate, CompletedDate, Importance, IsComplete, IsRecurring, Sensitivity, ReminderSet, ReminderTime, Body |

As described herein, a data item can be marked for cross-pollination which can effect the data item to automatically be populated onto all devices/sources in a network. A device can request all data items to be added from the data source in a network. Accordingly, the device transfers to the data source all data items that meet the designated criteria (e.g., add). It will be understood that, because the duplicated adds have been marked, they will not be issued upon the request. According to one aspect, a data item on a device can track three properties, ItemID, ServerID and SyncHash. It will be appreciated that the ServerID values and SyncHash can be stored as custom properties on each Item.

The ItemID can be used to uniquely identify the data item. ServerID can represent the ID that identifies the item at the server (e.g., desktop, PC1, PC2). It is to be appreciated that an item can have multiple Server IDs stored as custom properties in the item. The SyncHash is the sync hash value used to detect duplicates. This value can be calculated/re-calculated upon each change. In accordance with an aspect, the ServerID property can have four states: Sync Pending, Valid ServerID, Pending Delete and Not Syncing. Each of these states are described in greater detail below.

The Sync Pending state describes when an item is on a device and not yet synchronized to the target data source. The item can be created on the data source upon next synchronization cycle. The Valid ServerID state refers to the situation whereby the item ServerID is stored to allow for proper mapping with the data source. Pending Delete is the state when the items ServerID has synchronized in the past to a particular data source but the user has requested that it no longer synchronize to the subject source. On the next synchronization cycle, the item is deleted from the data source and the property is cleared. Finally, Not Syncing refers to the state when the item is not synchronizing with the data source.

Figure 6:
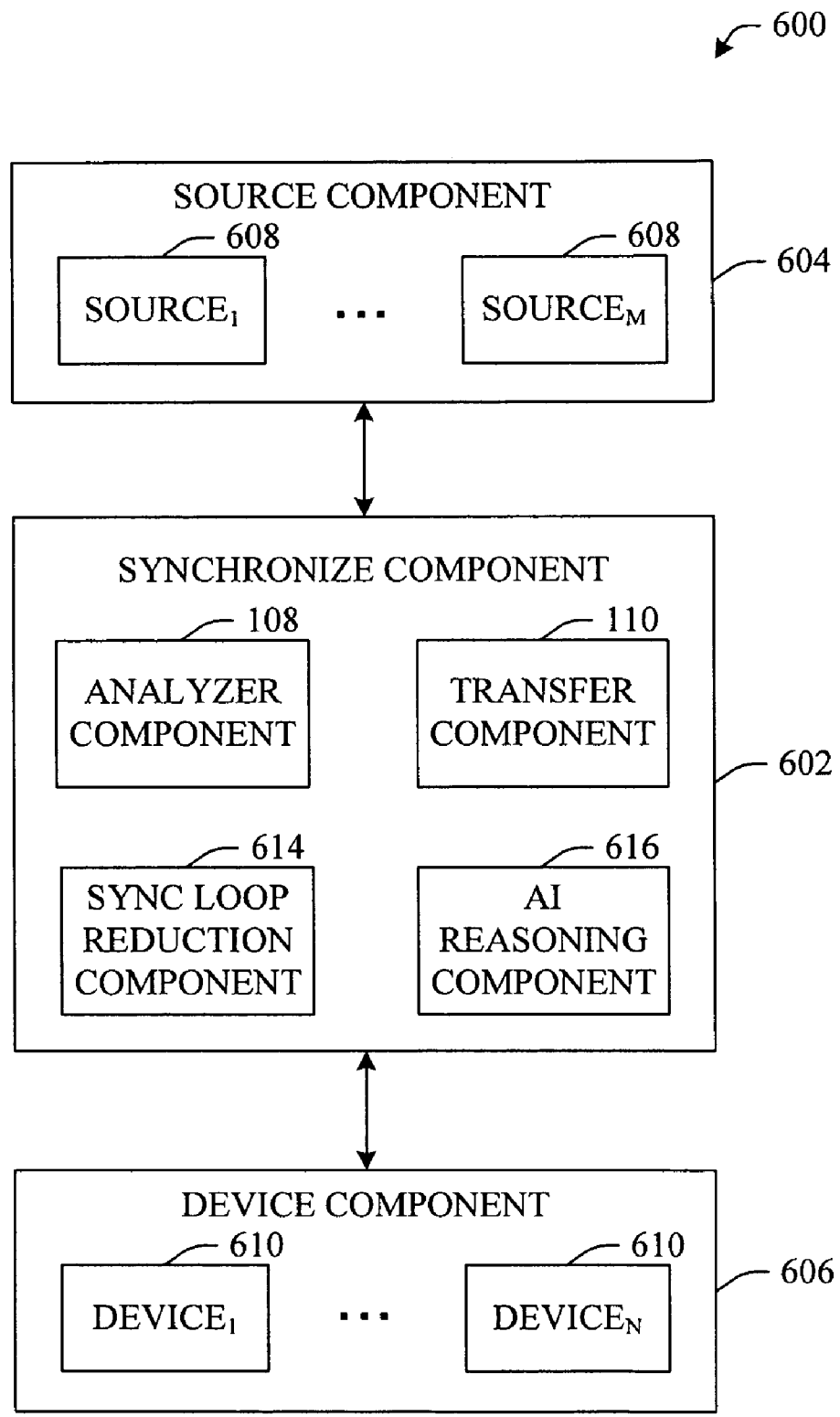
FIG. 6 illustrates a schematic block diagram of a cross-pollination system that employs a sync loop reduction component and/or an artificial intelligence component.

Turning now to FIG. 6, an alternative system 600 that facilitates cross-pollinating and/or synchronizing data in accordance with an aspect of the invention is shown. Generally, the system 600 can include a synchronize component 602, a source component 604 and a device component 606. As described supra with reference to FIG. 3, source component 604 can include 1 to M source components, where M is an integer. Source components 1 to M can be referred to collectively or individually as source components 608. Similarly, device component 606 can include 1 to N device components, where N is an integer. Device components 1 to N can be referred to individually or collectively as device components 610.

The alternative synchronize component 602 of FIG. 6 can include a sync loop reduction component 612 and an AI reasoning component 614. Although the aspect of FIG. 6 illustrates these two novel components together within the synchronize component 602, it is to be appreciated that other aspects exist whereby each of these novel components, together with the novel functionality, can be employed separately in connection with synchronize component 602.

The sync loop reduction component 612 can be employed to address situations of sync looping of data. As previously described, sync loops can occur during synchronization of data when a receiving entity (e.g., source or device) views the received data as a change to data already present within the receiving entity. As such, in conventional systems, the receiving entity would mark the received data as a new or changed data item thus, perpetuating (e.g., looping) the data item throughout the network. It will be understood that this phenomenon can result in an endless sync loop situation.

To address these conventional situations, a sync loop reduction component 612 can be provided. The sync loop reduction component 612 can be employed together with the analyzer component 108 to detect and halt sync loops. Essentially, the sync loop reduction component 612 can employ the results of the comparing functionality provided by the analyzer component 108 to address and eliminate the undesirable phenomenon of sync looping.

Continued reference to FIG. 6 illustrates that system 600 can employ artificial intelligence (AI) to facilitate automating one or more features in accordance with the subject invention. The subject invention (e.g., in connection with synchronizing, cross-pollinating, overwriting, deleting) can employ various AI-based schemes for carrying out various aspects thereof. For example, a process for determining when a data item will be updated as a result of synchronizing and/or cross-pollinating can be facilitated via an automatic classifier system and process. Moreover, where the data items are being cross-pollinated over various devices and/or sources, the classifier can be employed to determine which location(s) will accept any particular data item.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of PIM systems, for example, attributes can be words or phrases or other data-specific attributes derived from the words (e.g., database tables, the presence of key terms, and the classes are categories or areas of interest e.g., levels of priorities.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a data item is generated, when it is changed (e.g., updated), etc. The criteria can include, for example, the type of data, the importance of the data, and the level of confidence requested for synchronizing and/or cross-pollinating the data.

The AI component 614 can include predict and/or infer if a data item should be synchronized and/or cross-pollinated to a particular device/source. By way of example, the AI component can consider the factors such as memory capacity of a device/source, importance of the substance of the data item, origination location of the data item, etc. to automatically perform an action.

Figure 7:
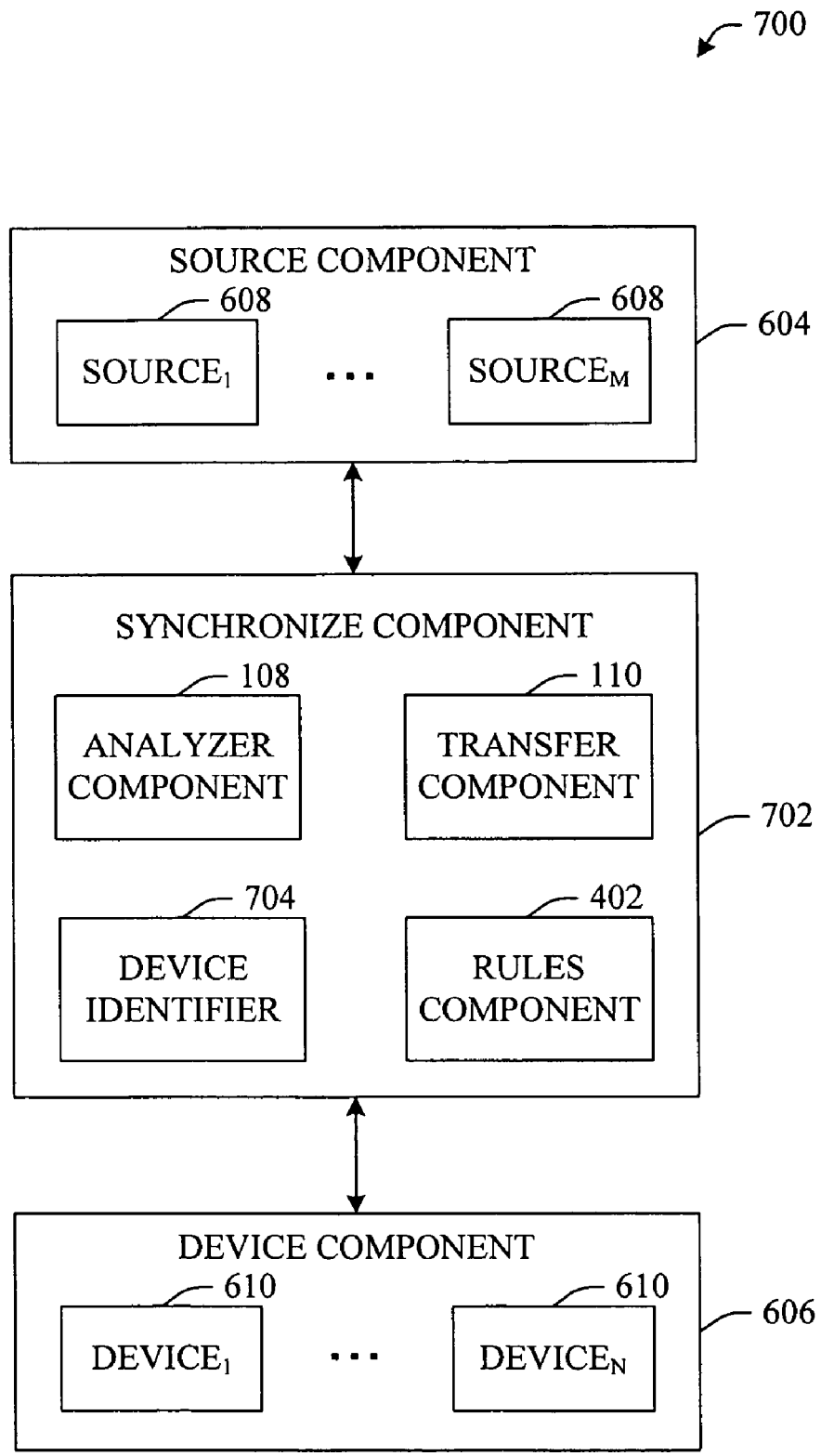
FIG. 7 is a block diagram of a cross-pollination system having a device identifier component integral to the synchronization component in accordance with an aspect.

Referring now to FIG. 7, an alternative synchronize component 702 can be employed in relation to system 700. In addition to the functionality of the synchronize components described above, synchronize component 702 can additionally include a device identifier 702 that can discover device specific criteria. This device specific criteria can be applied to the rules component 402 thus effecting appropriate synchronization and/or cross-pollinating operations. As well, it is to be appreciated that an AI component can be employed together or in place of the rules component 402 to utilize the information ascertained by the device identifier 402 (e.g., memory capacity, battery longevity).

Figure 8:
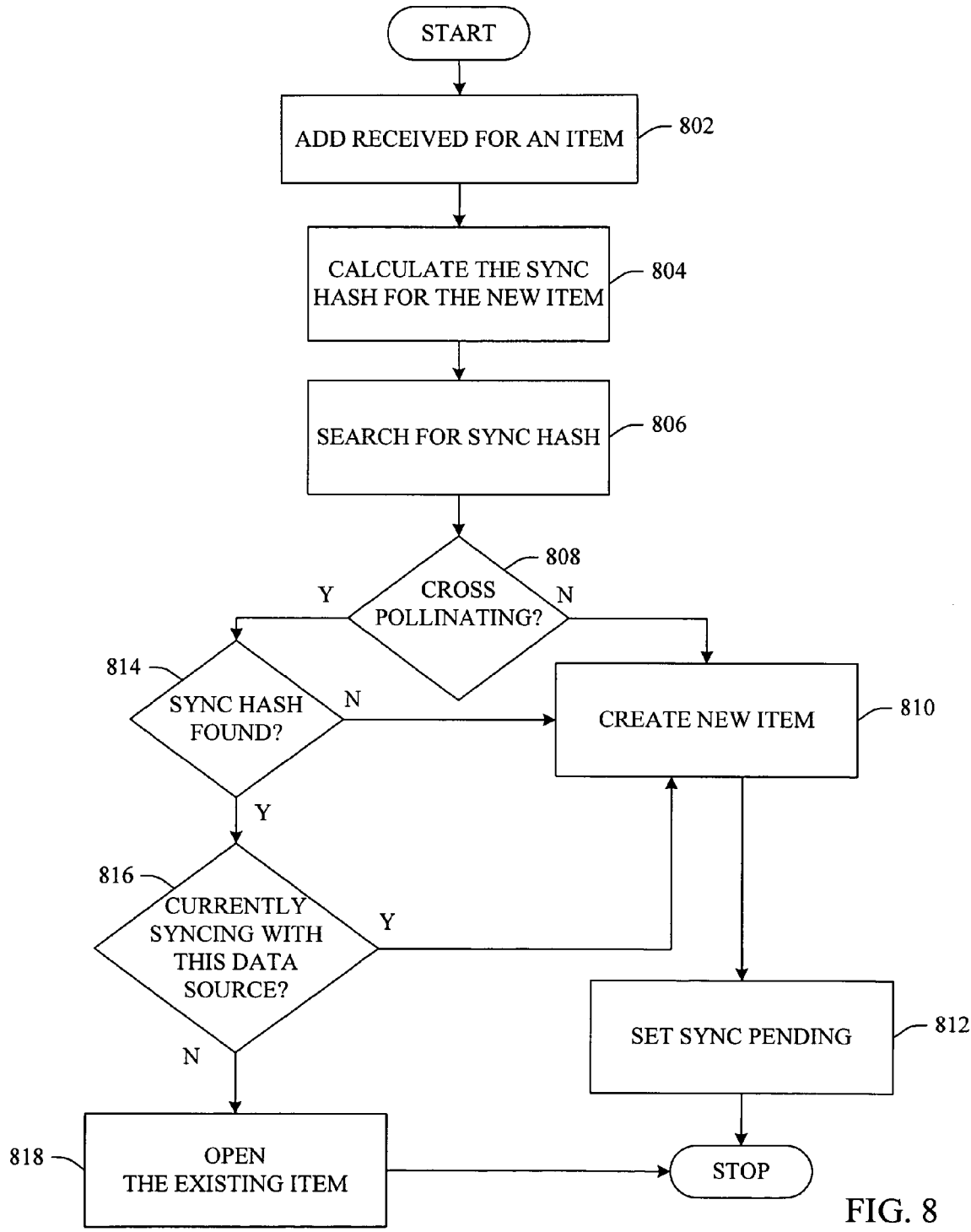
FIG. 8 illustrates an exemplary flow chart of procedures to add a data item in a cross-pollination system in accordance with a disclosed aspect.

The components described with reference to FIGS. 1 to 7 will be better understood following a review of the methodology of FIG. 8. Illustrated in FIG. 8 is a methodology that facilitates synchronizing and cross-pollinating a data item in response to an addition request in accordance with the invention. It is to be appreciated, that the methodology of FIG. 8 can facilitate detecting duplicate entries. At 802, an addition request is received with respect to a data item. This addition request can be received at the device and/or source locations.

At 804, a sync hash of the data item can be calculated. A search for the sync hash can be effected at 806. It will be appreciated that this search can be executed upon all or a subset of the contents of the device and/or source. At 808, a determination is made if cross-pollination is desired. As described above, the decision to cross-pollinate can be predefined by employing a rules-based logic or inferred by an AI component.

If, at 808, a determination is made that cross-pollination is not desired, a new item is created at 810. Accordingly, synchronization of the new item is set at 812. On the other hand, if at 808, cross-pollination is desired, the determination if the sync hash has been found is made at 814.

If the hash value is not found at 814, the system creates a new item at 810 and sets synchronization pending at 812. If the hash is determined to match an existing hash value, the data item is determined to be a duplicate. Accordingly, at 816, a decision is made if the data item is currently synchronizing with the subject data source. If currently synchronizing with this data source at 816, a new item is created at 810 and synchronization pending is set at 812. If the data item is not currently synchronizing with the subject data source, the data item is determined to be a duplicate at 818. Accordingly, the existing data item can be updated with identification data from the received data item.

The following scenarios are provided to add context to the invention. It is to be understood and appreciated that the scenarios that follow are not intended to limit the scope of the invention in any manner. Rather, the scenarios are provided to exhibit operational cross-pollination and/or synchronization aspects in accordance with the invention. It is to be understood that countless scenarios exist that can arise depending on user preference, number of devices, type of data, etc. These additional aspects are intended to fall within the scope of the invention and claims appended hereto.

Figure 9:
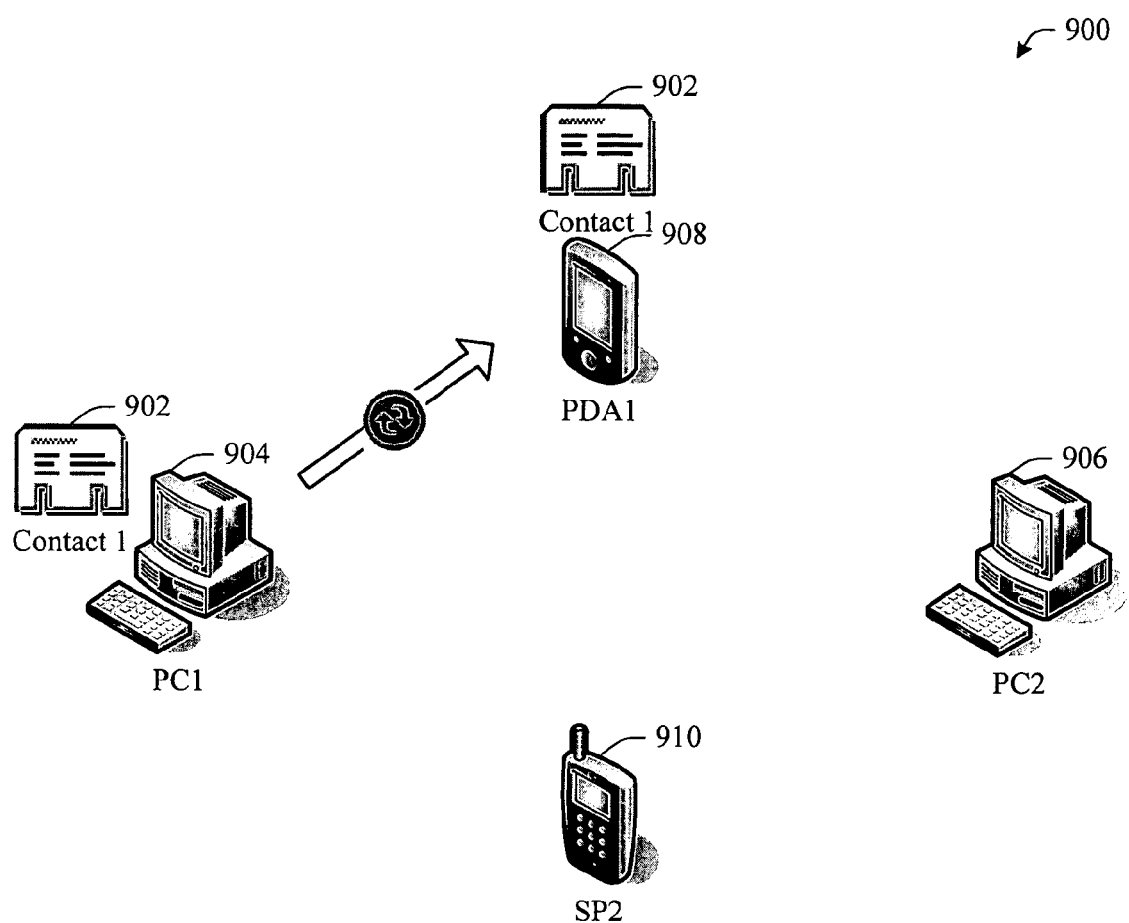
FIG. 9 is a cross-pollination synchronization system that illustrates synchronizing a contact from a first data source to a first device in accordance with an aspect.

FIGS. 9 to 19 illustrate an exemplary cross-pollination and/or synchronization system (e.g., network 900, 1300) in accordance with the invention. As shown in FIG. 9, a data item (e.g., contact 902) can be generated at a source device 904. The exemplary network 900 can include multiple source components (e.g., PC1 904, PC2 906) as well as multiple devices (e.g., PDA1 908, SP2 910). It will be appreciated that the network 900 shown is merely exemplary and that any number of source and/or device components can be employed without departing from the spirit and/or scope of the invention. As well, although the exemplary network employs personal computers (PC1 904, PC2 906), personal data assistant (PDA1 908) and smart phone (SP2 910) it is to be appreciated that the source and/or device components can be any device capable of managing data items as described herein.

Figure 10:
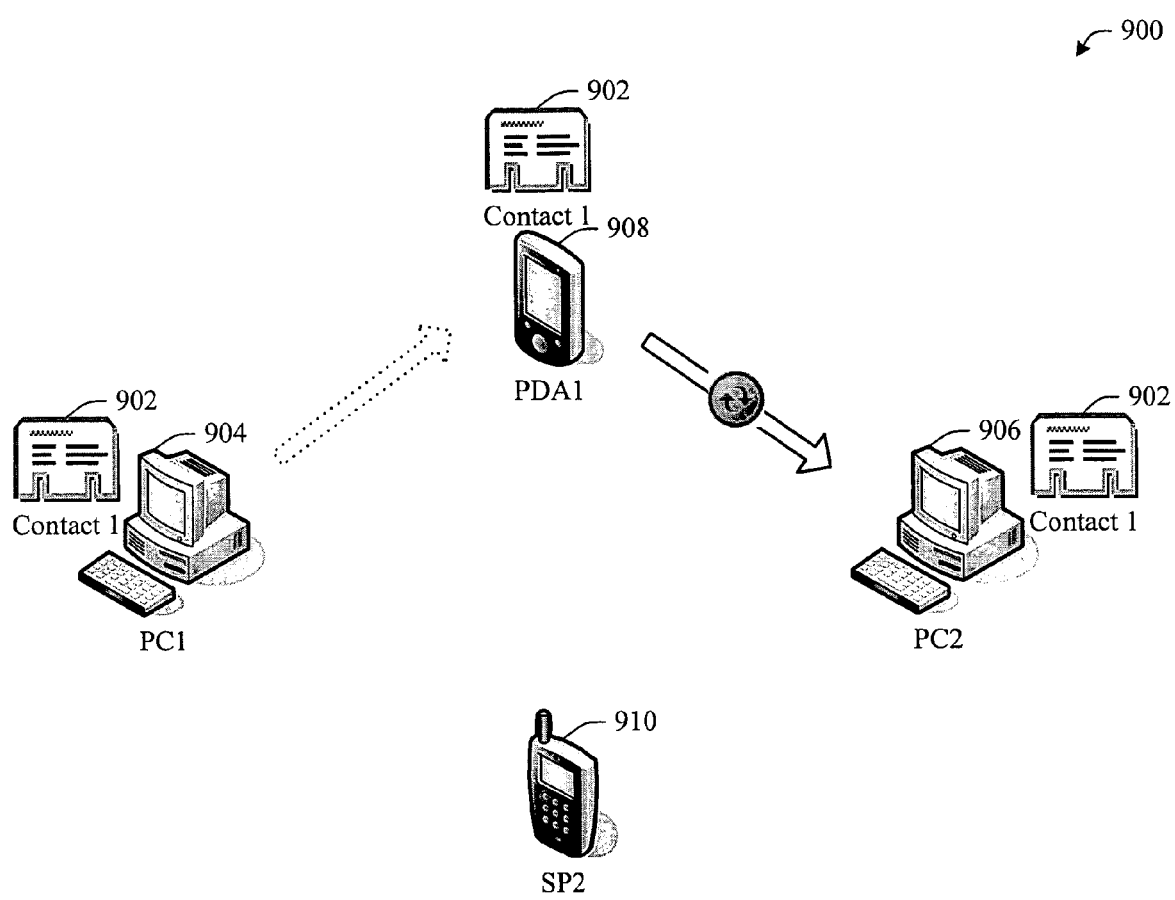
FIG. 10 is a cross-pollination synchronization system that illustrates cross pollinating the contact from the first data source to a second data source in accordance with an aspect.

Continuing with the example of FIG. 9, suppose a data item, Contact 1 902, is generated on PC1 904. As illustrated, this data item (Contact 1 902) can be synchronized onto PDA1 908 as shown. This synchronization can be user initiated and/or automatic. Once Contact 1 902 is resident in PDA1 908, if the network is set to cross-pollinate, Contact 1 902 can be automatically transferred (e.g., synchronized) onto PC2 906 as illustrated in FIG. 10. Effectively, Contact 1 902 is "cross-pollinated" from PC1 904 to PC2 906 through PDA1 908.

It will be appreciated that a rules-based logic and/or AI-based reasoning mechanism can be employed to effect such a cross-pollination. In other words, in one example, the system can be designed to cross-pollinate data items of a particular size, date stamp, item type, etc. in accordance with predefined rules and/or AI reasoning techniques.

Figure 11:
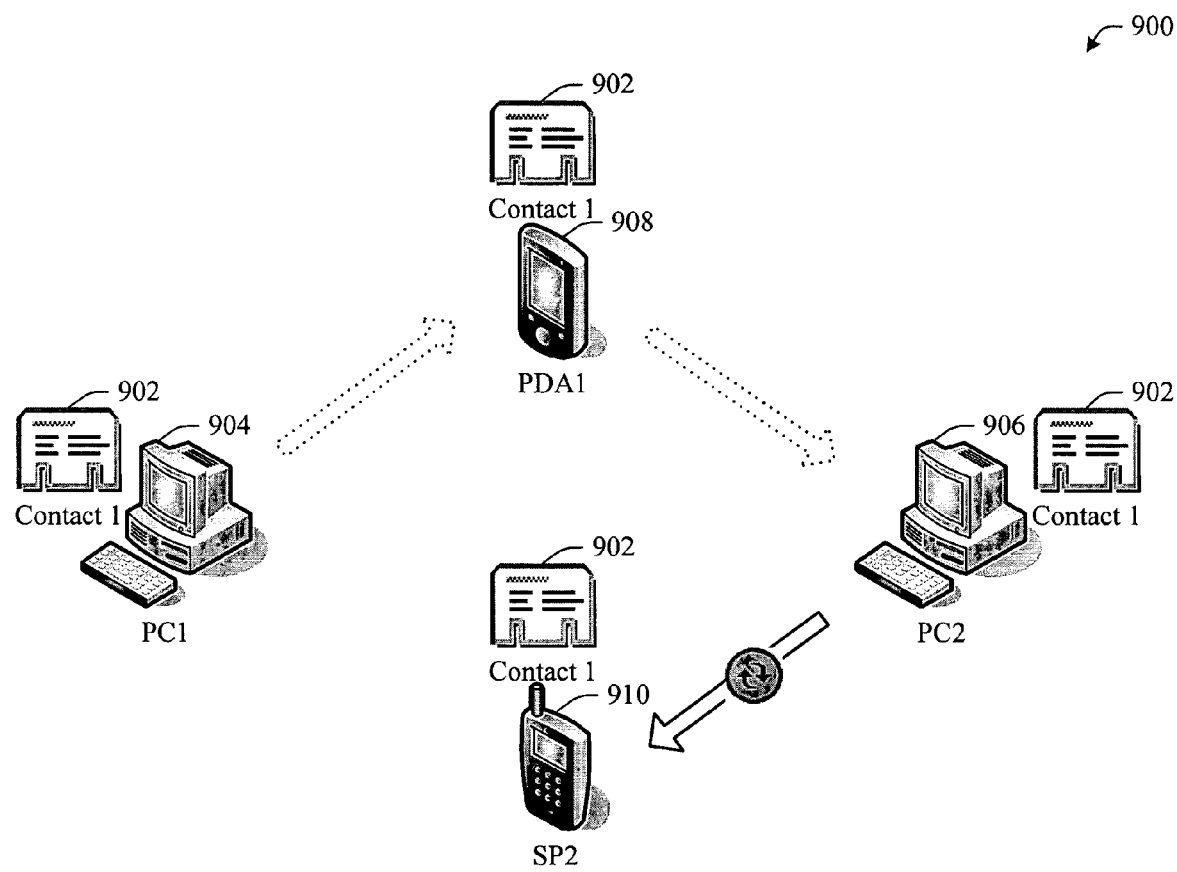
FIG. 11 is a cross-pollination synchronization system that illustrates synchronizing the contact from the second data source to a second device in accordance with an aspect.
Figure 12:
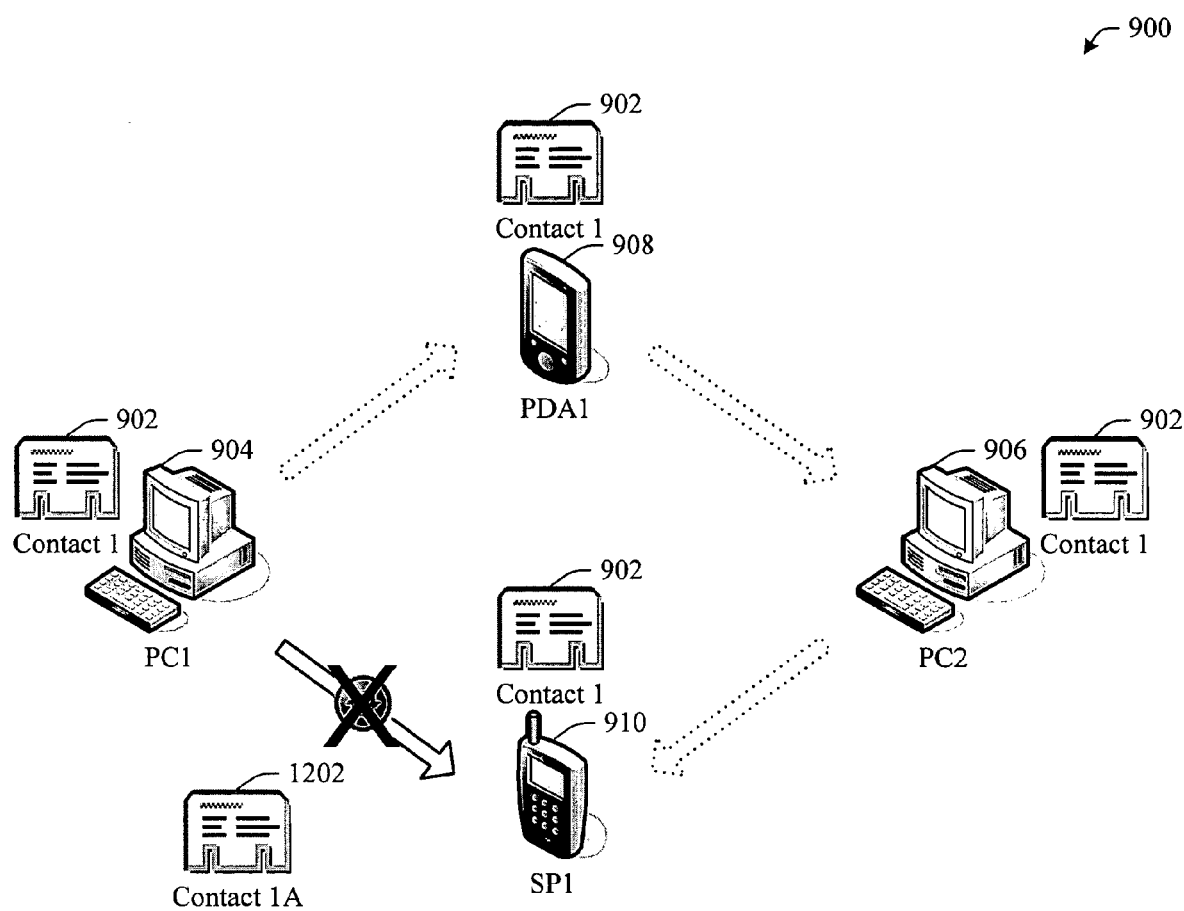
FIG. 12 is a cross-pollination synchronization system that illustrates prohibiting the re-synchronization of a contact from the first data source to the second device in accordance with an aspect.
Figure 13:
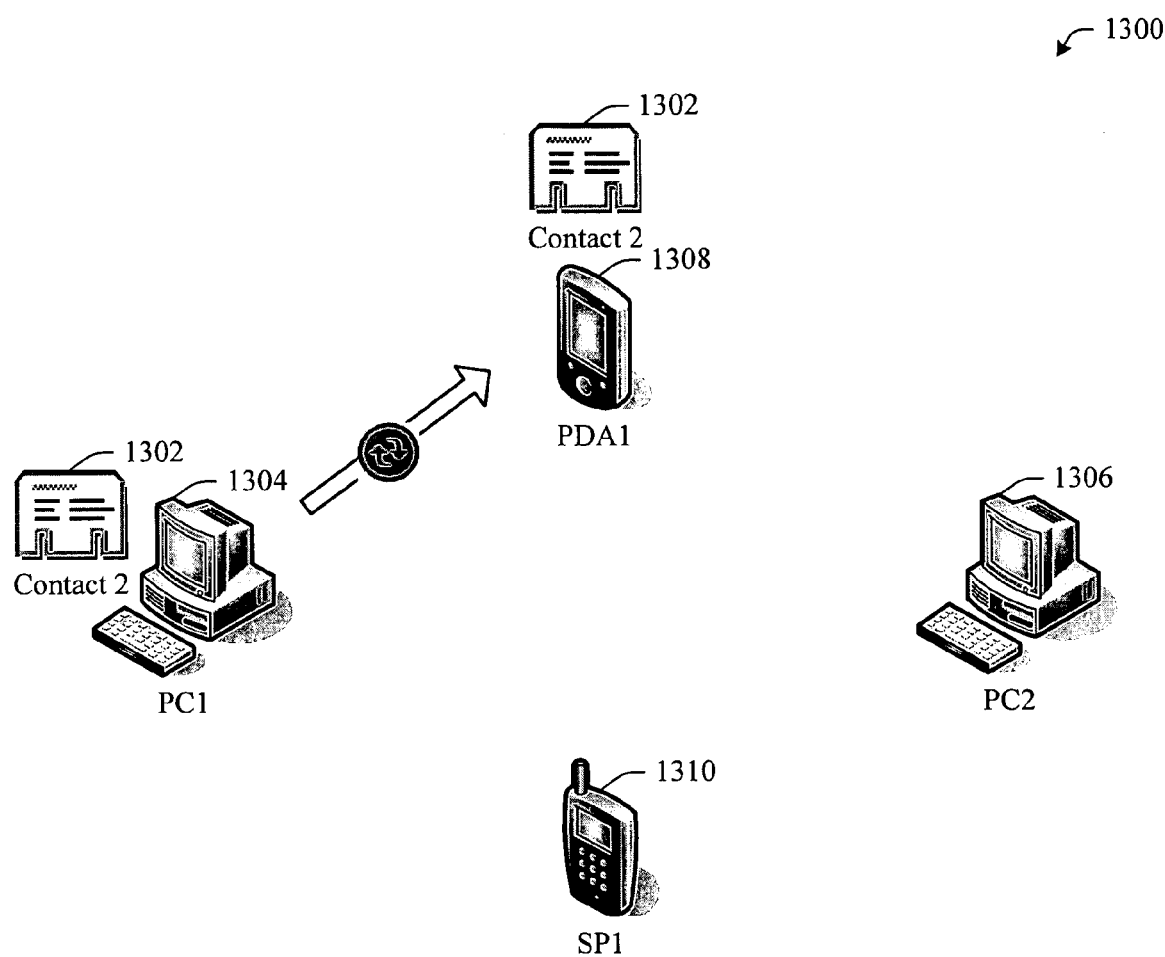
FIG. 13 is a cross-pollination synchronization system that illustrates synchronizing a contact from a data source to a first device in accordance with an aspect.

FIG. 11 illustrates that Contact 1 902 can be synchronized to SP1 910 from PC2 906. As a result, Contact 1 902 is completely synchronized and cross-pollinated with all devices in the network 900. Continuing with the example and with reference to FIG. 12, suppose a synchronization operation is effected upon SP1 910 to PC1 904. As illustrated, conventional systems would attempt to re-synchronize Contact 1 902 as a modified version, Contact 1A 1202. Thus, a sync loop could be generated whereby Contact 1A 1202 would appear as a change from Contact 1 902. As described supra, the invention can detect these duplicative items and prohibit a sync loop or other overwrite from occurring. This novel functionality of the subject invention is shown in FIG. 12 as indicted by the "X" superimposed over the synchronize operation indicator.

It is to be appreciated that cross-pollination can be toggled on or off as desired. For example, a user may not want to cross-pollinate personal items from a home source to a work source. This ability to toggle cross-pollination mechanisms affords a user greater control over data items. Additionally, as illustrated in the methodology of FIG. 8, if a device discontinues synchronizing with a source, the data items contained on the device can be purged from the contents of the device. Again, this novel feature lends additional data control to a user.

Figure 14:
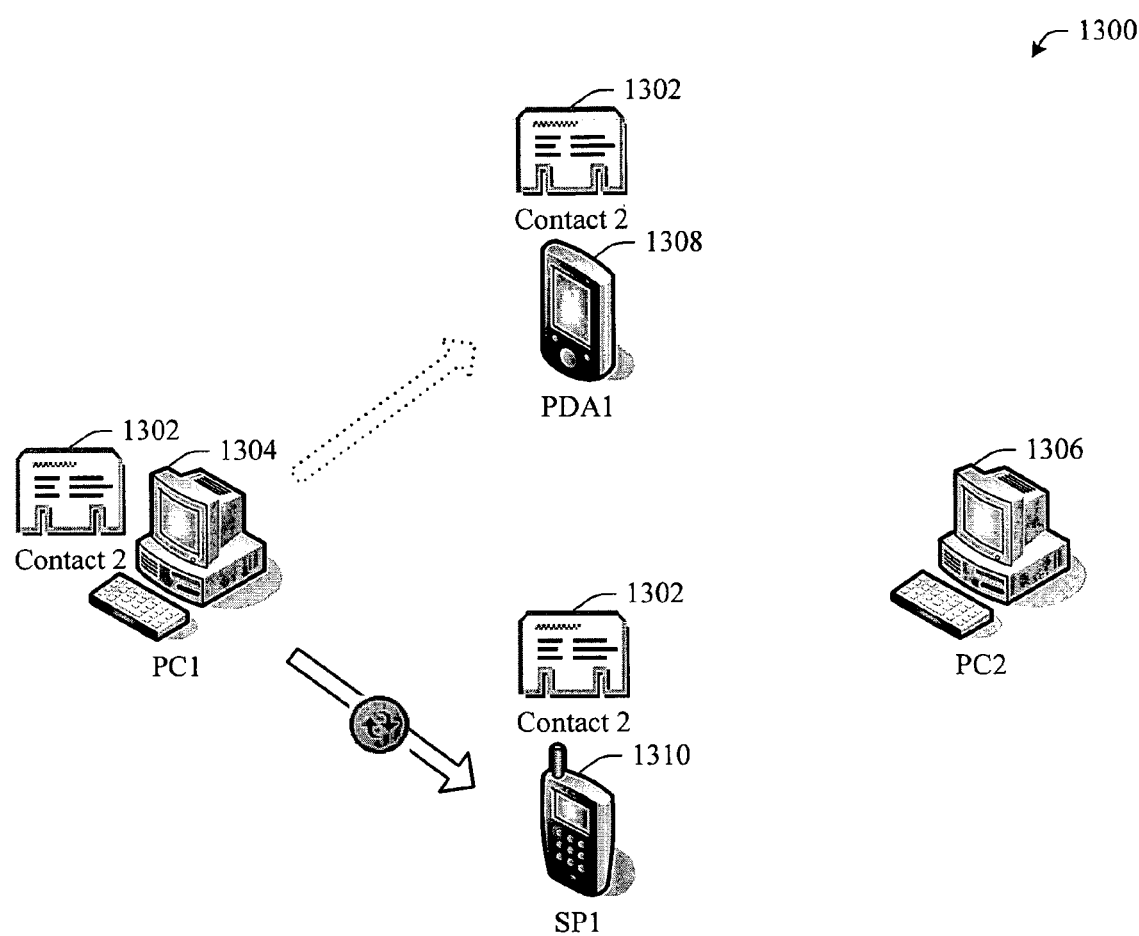
FIG. 14 is a cross-pollination synchronization system that illustrates synchronizing the contact from the first data source to a second device in accordance with an aspect.

Referring now to another exemplary network 1300. Generally, network 1300 can illustrate a data flow of Contact 2 1302 between multiple devices (e.g., PC1 1304, PC2, 1306, PDA1 1308 and SP1 1310). Initially, suppose Contact 2 is synchronized from PC1 1304 to PDA1 1308 as shown. Additionally, suppose Contact 2 is synchronized to SP1 1310 from PC1 1302 as illustrated in FIG. 14.

Figure 15:
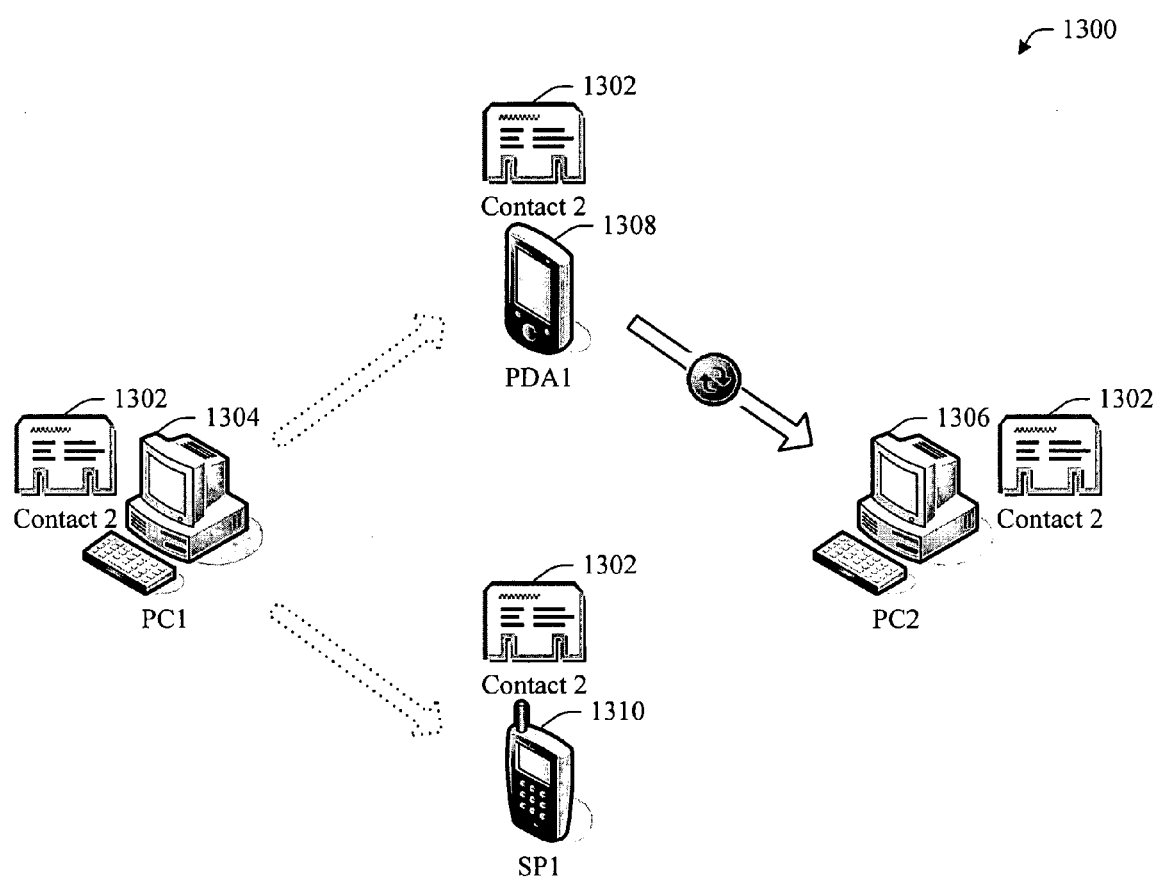
FIG. 15 is a cross-pollination synchronization system that illustrates cross-pollinating the contact from the first data source to a second data source via the first device in accordance with an aspect.
Figure 16:
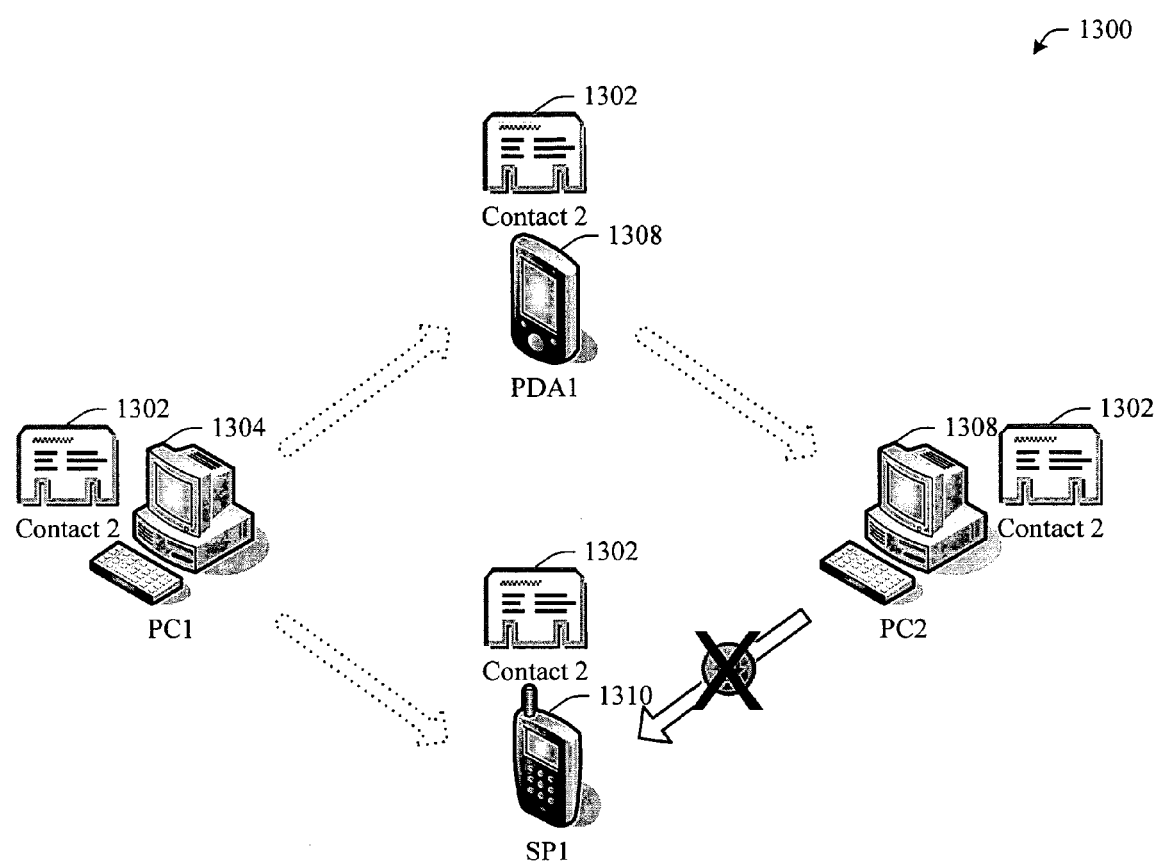
FIG. 16 is a cross-pollination synchronization system that illustrates prohibiting synchronization of the contact from the second data source to the second device in accordance with an aspect.

If cross-pollination is enabled, Contact 2 1302 can be sent to PC2 1306 as illustrated in FIG. 15. At this time, Contact 2 is present on all devices of network 1300. If, as illustrated in FIG. 16, PC2 1308 attempts to transfer Contact 2 1302 to SP1 1310, the item will be identified as a duplicate thus restricting the transfer.

Figure 17:
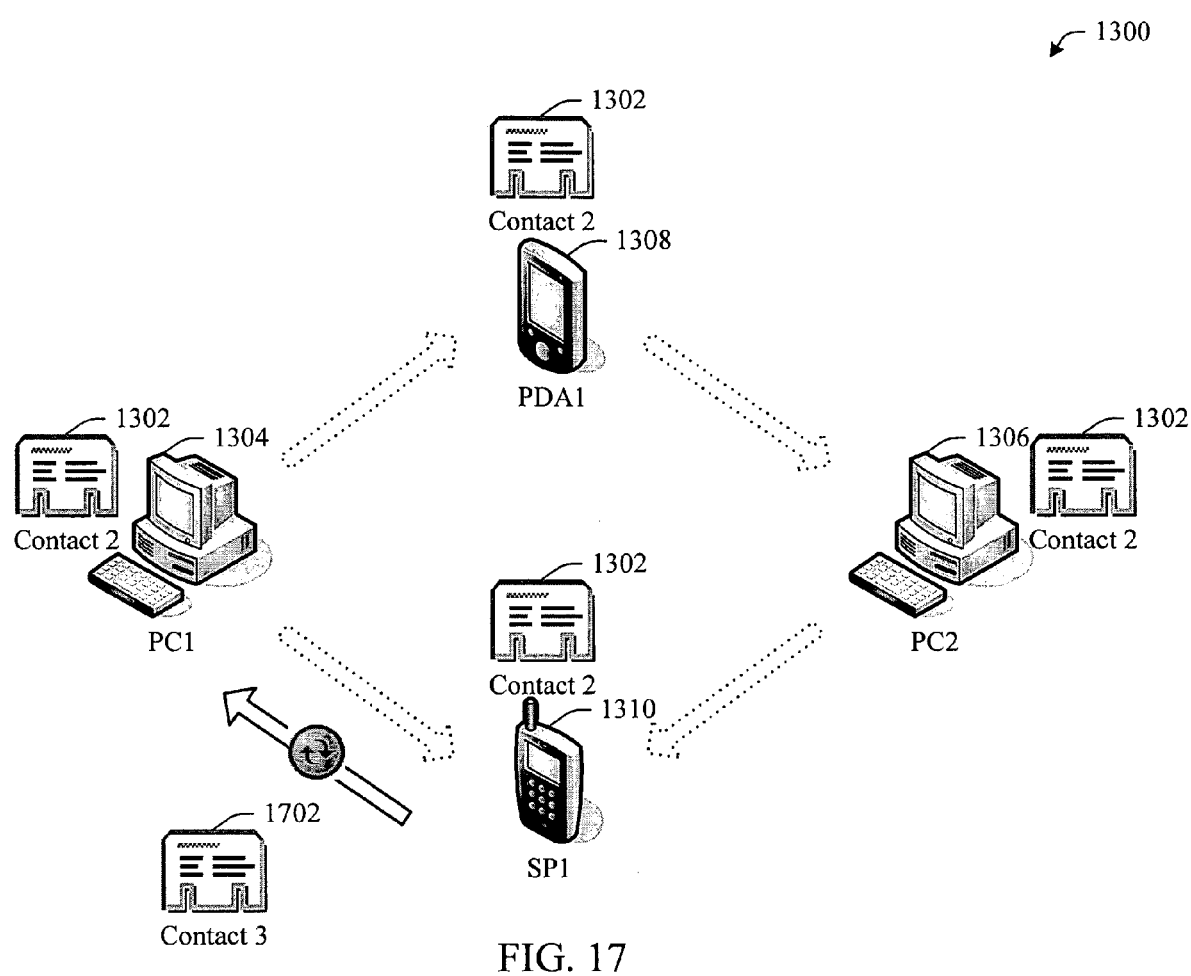
FIG. 17 is a cross-pollination synchronization system that illustrates originating a contact on a first device and synchronizing the contact to a first data source in accordance with an aspect.
Figure 18:
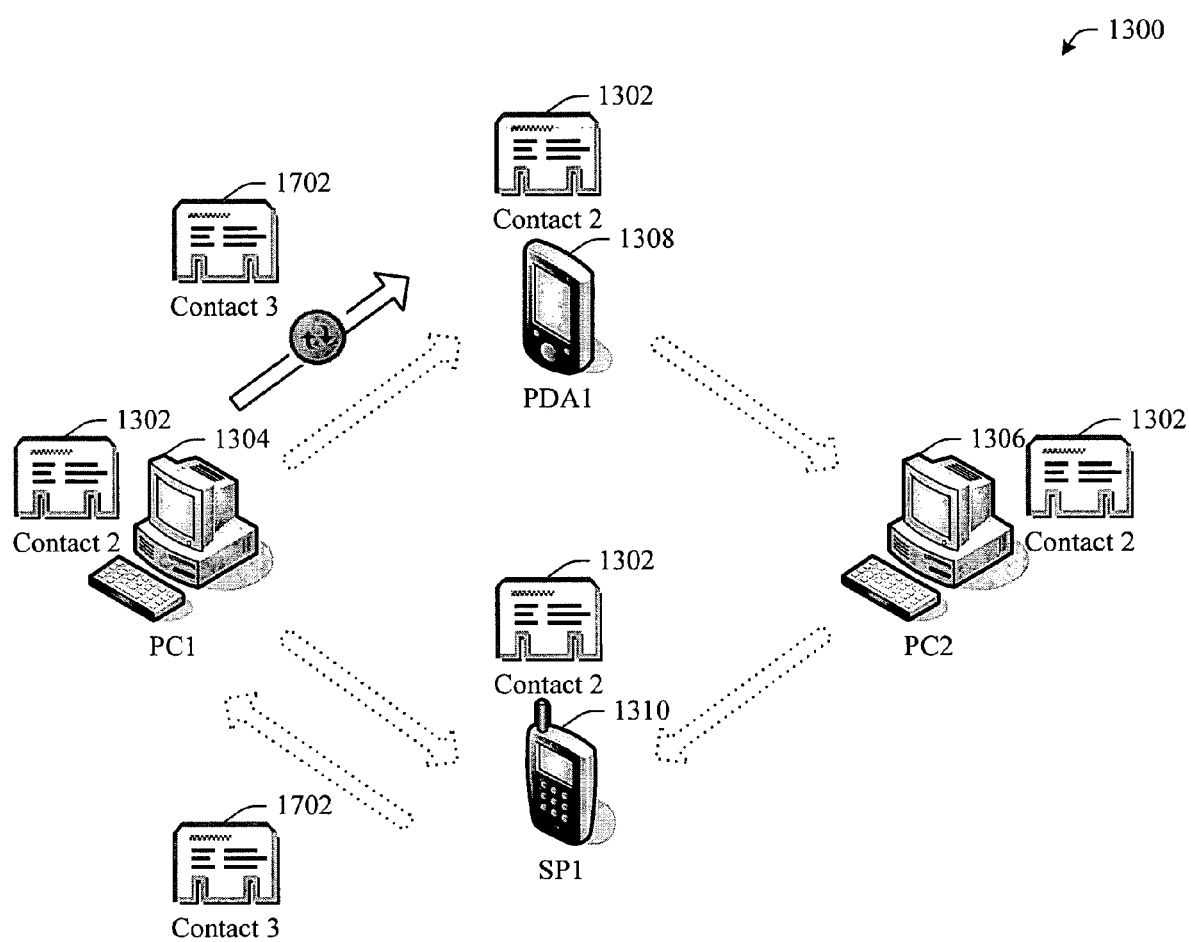
FIG. 18 is a cross-pollination synchronization system that illustrates synchronizing the contact from the first data source to a second device in accordance with an aspect.
Figure 19:
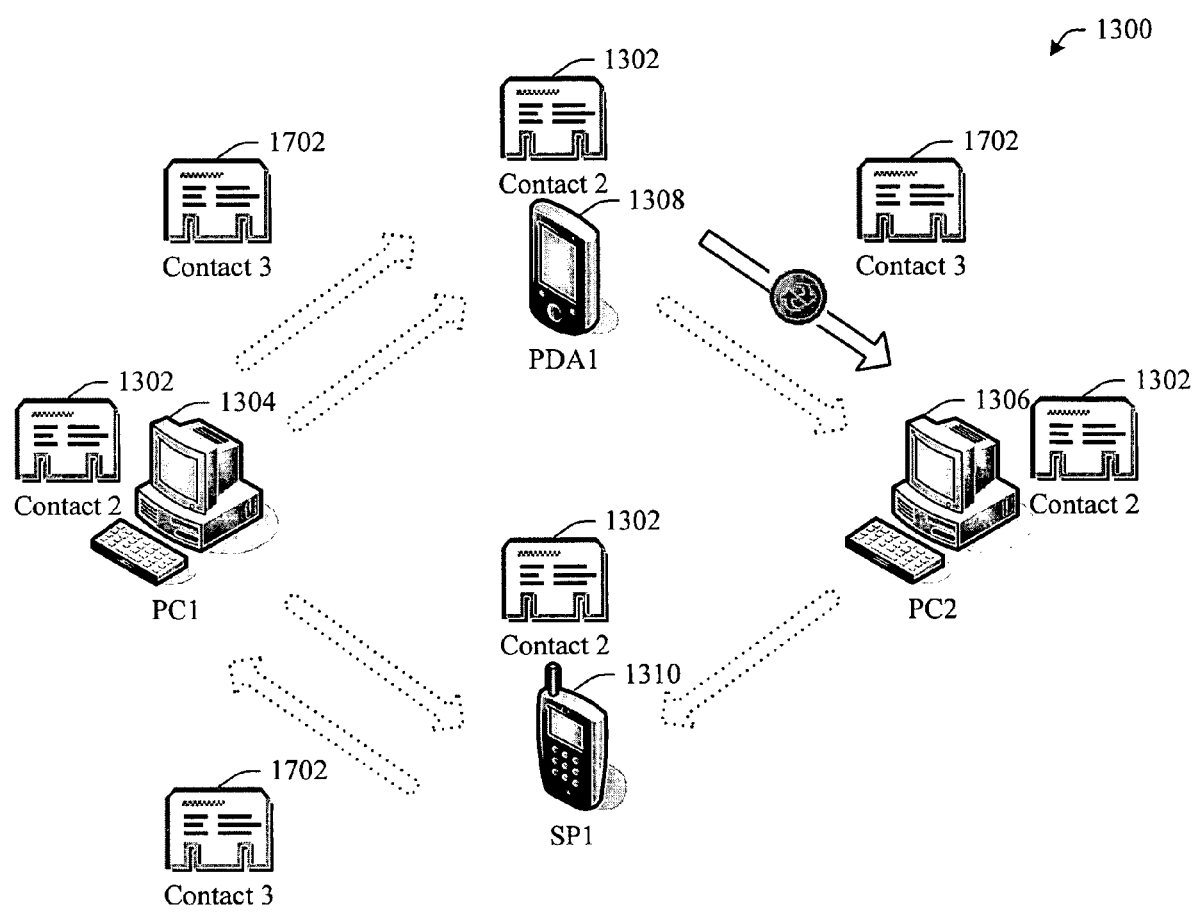
FIG. 19 is a cross-pollination synchronization system that illustrates cross-pollinating the contact from the first data source to a second data source in accordance with an aspect.

Continuing with the example of network 1300, FIG. 17 illustrates that Contact 3 1702 can be originated on SP1 1310 and transferred to PC1 1302. Accordingly, Contact 3 1702 can be cross-pollinated to PC2 1306 via PDA1 1308 as shown in FIGS. 18 and 19.

Figure 20:
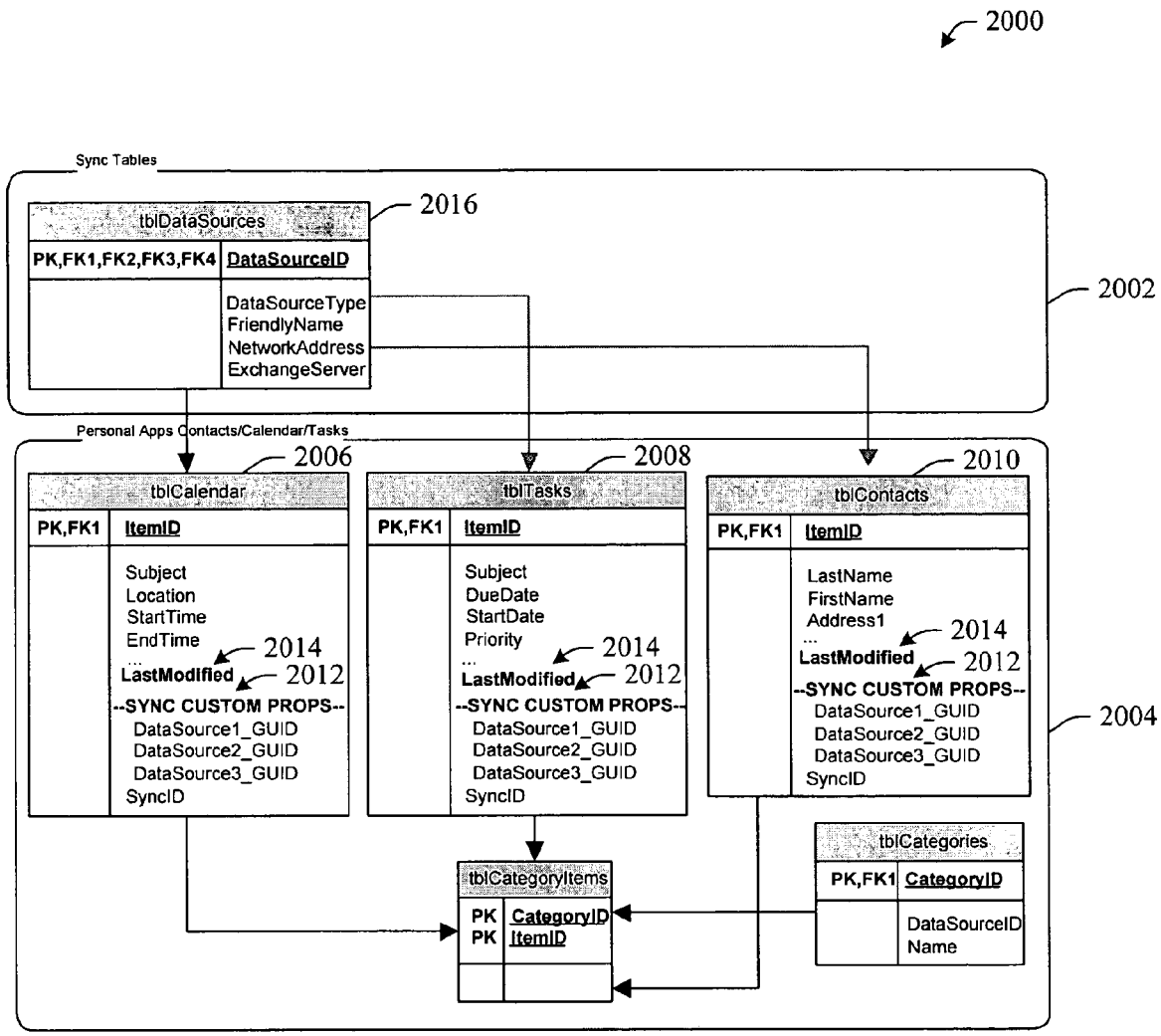
FIG. 20 illustrates an exemplary schema diagram of a sync table and database table in accordance with an aspect of the invention.

Referring now to FIG. 20, an exemplary schema diagram of a sync table 2002 is shown. It is to be appreciated that the subject invention can employ any mechanism to maintain synchronization states. For example, an SQL-CE-brand mechanism can be employed to maintain the states for synchronization.

With continued reference to FIG. 20, a database 2004 can be maintained that retains individual tables for data item types to be synchronized and/or cross-pollinated. For example, as illustrated, a calendar table 2006, a task table 2008 and a contacts table 2010 can be maintained.

Custom synchronization properties 2012 can be maintained in each of the exemplary tables (e.g., 2006, 2008, 2010) as illustrated. As well, modification data (e.g., LastModified variable 2014 can be retained upon generation and/or modification. This variable can be employed by the synchronize component to effect synchronization in accordance with desired procedure. For example, this variable assists in resolving conflicts between devices with respect to a particular data item. A change to any of the tables associated with an item can trigger an update to the LastModified variable 2014.

A Data Source table 2016 can be employed in connection with the sync table 2002. The Data Source table can provide data to track each data source. The DataSourceID can be any unique identifier assigned to a data source. The DataSourceType indicates the type of Data Source. In one aspect, this variable can be used to track the capabilities of a Data Source. The FriendlyName can be a name for each Data Source that is used by applications to identify stores. The NetworkAddress variable represents an address for the Data Source. It is to be understood that this value can be set depending on DataSourceType.

The following table illustrates exemplary Data Source APIs (application program interfaces) that can be employed in aspects of the invention.

| Data Source APIs | |
|---|---|
| Functionality | Description |
| Create Data Source<br>HRESULT CreateDataSource([in] UINT cProps, [in] CEPROPVALS* rgVals, [out] GUID *pDataSourceID); | Parameters:<br>DataSourceType<br>FriendlyName<br>NetworkAddress<br>ExchangeServer<br>The new Data Source is created and if successful, the new DataSourceID can be passed back in the OUT parameter. The FriendlyName passed in is unique. If the FriendlyName requested already exists an error may be returned to the calling function. |
| Edit Data Source | |
| HRESULT GetDataSourceProps([in] GUID DateSourceID, [in] UINT cProps, [in] CEPROPVALS* rgVals); HRESULT SetDataSourceProps([in] | Pass in DataSourceID to indicate which Data Source to update. All of the properties set in the |
| GUID DateSourceID, [in] UINT cProps,[in] CEPROPVALS* rgVals); | create operation can be edited. Editing any of these fields does not require a reset of the sync key. |
| Delete Data Source | |
| HRESULT DeleteDataSource([in] GUID DateSourceID); | Delete the requested Data Source and delete the column for this Data Source from the Tables. If an item was synchronizing but is now no longer connected to a sync source, delete the Item from the table. |
| Get Data Sources | |
| HRESULT EnumDataSourceFirst([out] HANDLE *phEnum, [out] GUID *pDataSourceID); HRESULT EnumDataSourceNext([in] HANDLE hEnum, [out] GUID *pDataSourceID); | Retrieve and enumerate through the list of Data Sources. |
| Set/Retrieve Sync To Settings for Item | |
| struct SyncDataSource {<br>  GUID DataSourceID;<br>  BOOL fSyncing;<br>}<br>HRESULT GetDataSourceForItem([in] GUID itemID, [in] GUID itemType, [out] SyncDataSource **ppSDS);<br>HRESULT SetDataSourceForItem([in] GUID itemID, [in] GUID itemType, [in] SyncDataSource *pSDS); | GetDataSourceForItem<br>For new items this API is called to determine the list of Data Sources the itemType can synchronize to and the default values (which Data Sources a new item should synchronize to by default)<br>For existing items this API is called to determine the list of valid Data Sources the item can synchronize to and the current sync values (where the item currently is synchronizing to).<br>Use this API to set the Sync To values for the itemID specified.<br>SetDataSourceForItem<br>This function responds to several situations<br>1: New Item - set the pending flags<br>2: Edit with same values - Do nothing<br>3: Edit with new values - Mark for pending delete or pending where appropriate. |

Figure 21:
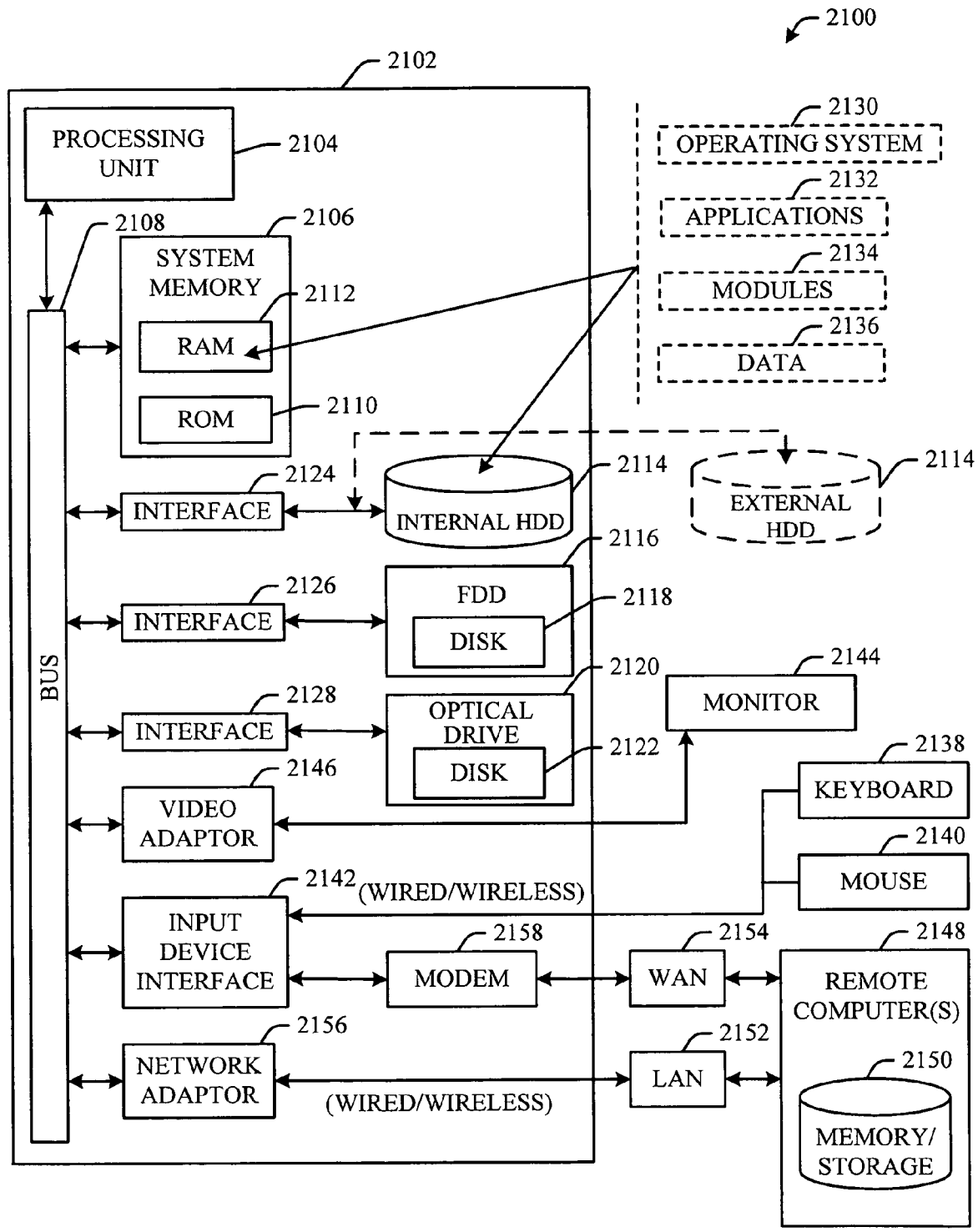
FIG. 21 illustrates a block diagram of a computer operable to execute the disclosed architecture.

Referring now to FIG. 21, there is illustrated a block diagram of a computer operable to execute the disclosed architecture. In order to provide additional context for various aspects of the subject invention, FIG. 21 and the following discussion are intended to provide a brief, general description of a suitable computing environment 2100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 21, the exemplary environment 2100 for implementing various aspects of the invention includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures may also be employed as the processing unit 2104.

The system bus 2108 can be any of several types of bus structure that may further interconnect to a memory bus (with or without a memory controller), a peripheral bus, and a local bus using any of a variety of commercially available bus architectures. The system memory 2106 includes read-only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 may also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. It is appreciated that the invention can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but can be connected by other interfaces, such as a parallel port, an IEEE 1394 serial port, a game port, a USB port, an IR interface, etc.

A monitor 2144 or other type of display device is also connected to the system bus 2108 via an interface, such as a video adapter 2146. In addition to the monitor 2144, a computer typically includes other peripheral output devices (not shown), such as speakers, printers, etc.

The computer 2102 may operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which may connect to a global communications network, e.g., the Internet.

When used in a LAN networking environment, the computer 2102 is connected to the local network 2152 through a wired and/or wireless communication network interface or adaptor 2156. The adaptor 2156 may facilitate wired or wireless communication to the LAN 2152, which may also include a wireless access point disposed thereon for communicating with the wireless adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wired or wireless device, is connected to the system bus 2108 via the serial port interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 22:
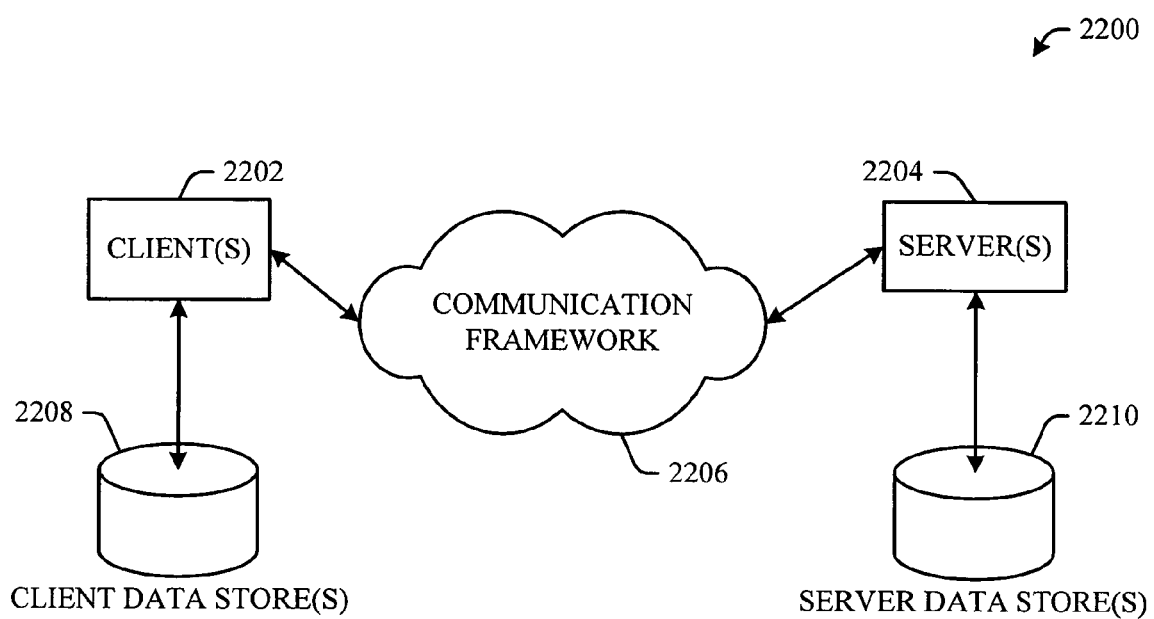
FIG. 22 illustrates a schematic block diagram of an exemplary computing environment in accordance with the subject invention.

Referring now to FIG. 22, there is illustrated a schematic block diagram of an exemplary computing environment 2200 in accordance with the subject invention. The system 2200 includes one or more client(s) 2202. The client(s) 2202 can be hardware and/or software (e.g., threads, processes, computing devices). The client(s) 2202 can house cookie(s) and/or associated contextual information by employing the invention, for example.

The system 2200 also includes one or more server(s) 2204. The server(s) 2204 can also be hardware and/or software (e.g., threads, processes, computing devices). The servers 2204 can house threads to perform transformations by employing the invention, for example. One possible communication between a client 2202 and a server 2204 can be in the form of a data packet adapted to be transmitted between two or more computer processes. The data packet may include a cookie and/or associated contextual information, for example. The system 2200 includes a communication framework 2206 (e.g., a global communication network such as the Internet) that can be employed to facilitate communications between the client(s) 2202 and the server(s) 2204.

Communications can be facilitated via a wired (including optical fiber) and/or wireless technology. The client(s) 2202 are operatively connected to one or more client data store(s) 2208 that can be employed to store information local to the client(s) 2202 (e.g., cookie(s) and/or associated contextual information). Similarly, the server(s) 2204 are operatively connected to one or more server data store(s) 2210 that can be employed to store information local to the servers 2204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates synchronizing data, comprising:
   a processor;
   a computer-readable storage medium operationally coupled to the processor and storing computer executable instructions that when executed by the processor, implement components comprising:
   an analyzer component that is configured to analyze a first data item from a source, the first data item including a plurality of properties supported by the source, wherein the analyzer component is configured to compare the first data item with a second data item of a device and determines that the first data item and the second data item are duplicate data items; and
   a transfer component configured to transmit the first data item and a command to the device in accordance with the output from the analyzer component, wherein the command causes the system to synchronize the second data item by updating at least one property of the second data item with at least one respective property in the first data item while leaving at least one other property of the second data item unchanged, based on the determination that the first data item and the second data item are duplicate data items and a determination that the at least one other property of the second data item is unsupported by the source and not included in the first data item.

2. The system of claim 1, wherein a soft delete command is selected if the first data item is out of filter for a filter associated with the device.

3. The system of claim 1, wherein the analyzer component is configured to determine a version of the first data item and compares the version of the first data item with a version of the second data item.

4. The system of claim 1, wherein the transfer component is configured to transmit the first data item to a plurality of disparate devices in accordance with a rule.

5. The system of claim 1, wherein the analyzer component is configured to compare a property of the first data item with a property of the second data item.

6. The system of claim 1, the analyzer component further comprises a hash component that is configured to facilitate comparing the received first data item with the second data item.

7. The system of claim 1, further comprising a sync loop reduction component that is configured to, based at least in part upon the output from the analyzer component, instruct the transfer component to discontinue a sync loop.

8. The system of claim 1, further comprising a device identifier that is configured to determine a configuration of the device and communicate the configuration to the analyzer component; the analyzer component further configured to employ the configuration to determine the output.

9. The system of claim 1, further comprising a rules component that is configured to facilitate determining the output in accordance with a rule.

10. The system of claim 1, further comprising an artificial intelligence component that is configured to infer an action that a user desires to be automatically performed.

11. A computer-implemented method of cross-pollinating data, the method comprising:
receiving a request to add a first data item to a device;
receiving the first data item from a first source;
storing the first data item in memory on the device;
after storing the first data item in memory, receiving a request to add a second data item to the device;
receiving the second data item from a second source;
determining that the second data item is to be cross-pollinated between the first and second sources via the device;
determining that the second data item is a duplicate of the first data item;
comparing one or more properties of the first data item to a one or more respective properties of the second data item; and
synchronizing the second data item with the device if the first data item and the second data item are determined to be duplicates, and if the one or more properties of the first data item are different from the respective one or more properties of the second data item, synchronizing comprising updating at least one property of the first data item to include identification data from the second data item without creating a duplicate of the first data item in the memory while leaving at least one other property of the first data item unchanged, the at least one other property of the first data item being a property that is not supported by the second source and not included in the second data item.

12. The computer-implemented method of claim 11, wherein the one or more properties is at least one of a hash value, a time stamp, a version indicator and an identifier.

13. The computer-implemented method of claim 12, wherein the or more properties is a combination of at least two of a hash value, time stamp, version indicator and an identifier.

14. The computer-implemented method of claim 12, wherein the act of determining that the first and second data items are duplicates includes generating a hash value of the first data item.

15. The computer-implemented method of claim 12, wherein the act of synchronizing includes synchronizing based at least in part upon a rule.

16. A system of cross-pollinating data, comprising:
means for receiving a first data item from a source;
means for comparing the first data item to a second data item stored on a disparate source to determine a distinguishable characteristic; and
means for cross-pollinating the first data item to the disparate source if the first data item has a distinguishable characteristic from the second data item, the means for cross-pollinating capable of executing any of a soft delete command, a hard delete command, and a resolve conflict command, wherein cross-pollinating comprises updating a property of the first data item with a respective property of the second data item while leaving at least one other property of the first data item unchanged if the first data item is determined to be a duplicate of the second data item, the at least one other property of the first data item being a property that is not supported by the second source and not included in the second data item.

17. The system of claim 16, further comprising means for computing a hash of the first data item and means for comparing the hash of the first data item to a hash of the second data item.

18. The system of claim 16, wherein the soft delete command is selected if the first data item is out of filter for a filter associated with the disparate source.

19. The system of claim 16, the distinguishable characteristic is a combination of at least two of a hash value, a time stamp, a version indicator and a property value.

20. A method of facilitating synchronization of data, the method comprising:
receiving at a device a first data item from a source, the first data item having a first plurality of item properties supported by the source;
comparing the first data item received from the source with a second data item stored in the memory, the second data item having a second plurality of item properties including a subset of item properties absent from the first plurality of item properties, thereby determining that the first data item and the second data item are duplicate data items; and
upon determining that the first data item and the second data item are duplicate data items, synchronizing the second data item with the first data item, wherein synchronizing the second data item and the first data item includes updating item properties included within the first plurality of item properties and the second plurality of item properties without updating the subset of item properties that are absent from the first plurality of item properties.

21. The method of claim 20, further comprising, prior to receiving the first data item at the device, receiving the second data item from a second source.

22. The method of claim 20, wherein the device comprises a source computing system.

23. The method of claim 20, wherein the source comprises a mobile device.

* * * * *